(12) United States Patent
Duan et al.

(10) Patent No.: US 12,164,027 B1
(45) Date of Patent: Dec. 10, 2024

(54) MULTI-PATHWAY DISTANCE MEASUREMENTS FOR OPTICAL SENSORS

(71) Applicant: Apple Inc., Cupertino, CA (US)

(72) Inventors: Xiyu Duan, San Jose, CA (US);
Nicholas P. Allec, Champaign, IL (US);
Ueyn L. Block, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 915 days.

(21) Appl. No.: 17/020,659

(22) Filed: Sep. 14, 2020

(51) Int. Cl.
*G01S 17/08* (2006.01)
*G01S 7/48* (2006.01)
*G01S 7/4863* (2020.01)

(52) U.S. Cl.
CPC ............ *G01S 17/08* (2013.01); *G01S 7/4808* (2013.01); *G01S 7/4863* (2013.01)

(58) Field of Classification Search
CPC ................................ G01S 17/08; G01S 7/4863
See application file for complete search history.

(56) References Cited

U.S. PATENT DOCUMENTS

| | | | |
|---|---|---|---|
| 4,913,150 A | 4/1990 | Cheung et al. | |
| 4,931,767 A * | 6/1990 | Albrecht | B60Q 9/00 356/342 |
| 5,287,376 A | 2/1994 | Paoli | |
| 5,483,261 A | 1/1996 | Yasutake | |
| 5,488,204 A | 1/1996 | Mead et al. | |
| 5,488,678 A | 1/1996 | Taneya | |
| 5,617,439 A | 4/1997 | Kakimoto | |
| 5,644,667 A | 7/1997 | Tabuchi | |
| 5,742,631 A | 4/1998 | Paoli | |
| 5,825,352 A | 10/1998 | Bisset et al. | |
| 5,835,079 A | 11/1998 | Shieh | |
| 5,848,088 A | 12/1998 | Mori et al. | |
| 5,880,411 A | 3/1999 | Gillespie et al. | |

(Continued)

FOREIGN PATENT DOCUMENTS

| | | |
|---|---|---|
| CN | 103876726 | 6/2014 |
| CN | 203943664 | 11/2014 |

(Continued)

OTHER PUBLICATIONS

US 11,819,316 B1, 11/2023, Allec et al. (withdrawn)

(Continued)

*Primary Examiner* — Yuqing Xiao
*Assistant Examiner* — Zhengqing Qi
(74) *Attorney, Agent, or Firm* — Brownstein Hyatt Farber Schreck, LLP

(57) ABSTRACT

Disclosed herein are electronic devices, detectors, systems, and methods for estimating a distance to an exterior object. Light pulses from an emitter on the electronic device or detector are received by at least one pair of light detectors positioned at different distances from the emitter. One or more ratios of strengths of signals of the light detectors are used to determine the object's distance. The ratios may be compared to a proximity curve to obtain the object's distance. If the ratio exceeds a critical distance value, a determination may be made that the exterior object has been separated from the electronic device. Wearable electronic devices, such as smart watches, may use the detectors, systems, and methods to determine if a user is wearing the electronic device.

20 Claims, 10 Drawing Sheets

(56) References Cited

U.S. PATENT DOCUMENTS

| | | |
|---|---|---|
| 5,940,556 A | 8/1999 | Moslehi et al. |
| 6,083,172 A | 7/2000 | Baker, Jr. et al. |
| 6,094,270 A * | 7/2000 | Uomori .................. G01S 17/46 356/623 |
| 6,122,042 A | 9/2000 | Wunderman et al. |
| 6,188,391 B1 | 2/2001 | Seely et al. |
| 6,310,610 B1 | 10/2001 | Beaton et al. |
| 6,313,612 B1 | 11/2001 | Honda |
| 6,330,378 B1 | 12/2001 | Forrest |
| 6,345,133 B1 | 2/2002 | Morozov |
| 6,393,185 B1 | 5/2002 | Deacon |
| 6,526,300 B1 | 2/2003 | Kiani et al. |
| 6,533,729 B1 | 3/2003 | Khair |
| 6,584,136 B2 | 6/2003 | Ju et al. |
| 6,594,409 B2 | 7/2003 | Dutt et al. |
| 6,615,065 B1 | 9/2003 | Barrett et al. |
| 6,628,686 B1 | 9/2003 | Sargent |
| 6,657,723 B2 | 12/2003 | Cohen |
| 6,662,033 B2 | 12/2003 | Casciani et al. |
| 6,690,387 B2 | 2/2004 | Zimmerman et al. |
| 6,795,622 B2 | 9/2004 | Forrest |
| 6,882,874 B2 | 4/2005 | Huiku |
| 6,892,449 B1 | 5/2005 | Brophy et al. |
| 6,940,182 B2 | 9/2005 | Hilton et al. |
| 6,947,639 B2 | 9/2005 | Singh |
| 6,952,504 B2 | 10/2005 | Bi |
| 6,987,906 B2 | 1/2006 | Nakama et al. |
| 7,015,894 B2 | 3/2006 | Morohoshi |
| 7,054,517 B2 | 5/2006 | Mossberg |
| 7,058,245 B2 | 6/2006 | Farahi |
| 7,079,715 B2 | 7/2006 | Kish |
| 7,184,064 B2 | 2/2007 | Zimmerman et al. |
| 7,203,401 B2 | 4/2007 | Mossberg |
| 7,203,426 B2 | 4/2007 | Wu et al. |
| 7,206,621 B2 | 4/2007 | Aoyagi et al. |
| 7,209,611 B2 | 4/2007 | Joyner |
| 7,245,379 B2 | 7/2007 | Schwabe |
| 7,269,356 B2 | 9/2007 | Winzer |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,444,048 B2 | 10/2008 | Peters et al. |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,616,110 B2 | 11/2009 | Crump et al. |
| 7,643,860 B2 | 1/2010 | Gueissaz |
| 7,663,607 B2 | 2/2010 | Hotelling et al. |
| 7,680,364 B2 | 3/2010 | Nilsson |
| 7,689,075 B2 | 3/2010 | Jenkins et al. |
| 7,720,328 B2 | 5/2010 | Yan |
| 7,885,302 B2 | 2/2011 | Eberhard |
| 7,885,492 B2 | 2/2011 | Welch |
| 7,974,504 B2 | 7/2011 | Nagarajan |
| 8,019,400 B2 | 9/2011 | Diab et al. |
| 8,175,670 B2 | 5/2012 | Baker, Jr. et al. |
| 8,300,994 B2 | 10/2012 | Welch et al. |
| 8,378,811 B2 | 2/2013 | Crump et al. |
| 8,463,345 B2 | 6/2013 | Kuhn et al. |
| 8,515,217 B2 | 8/2013 | Bernasconi et al. |
| 8,559,775 B2 | 10/2013 | Babie et al. |
| 8,564,784 B2 | 10/2013 | Wang et al. |
| 8,618,930 B2 | 12/2013 | Papadopoulos et al. |
| 8,700,111 B2 | 4/2014 | LeBoeuf et al. |
| 8,724,100 B1 | 5/2014 | Asghari et al. |
| 8,792,869 B2 | 7/2014 | Prentice et al. |
| 8,873,026 B2 | 10/2014 | Puig |
| 8,920,332 B2 | 12/2014 | Hong et al. |
| 8,948,832 B2 | 2/2015 | Hong et al. |
| 8,983,250 B2 | 3/2015 | Black et al. |
| 9,020,004 B2 | 4/2015 | Jeong |
| 9,028,123 B2 | 5/2015 | Nichol |
| 9,031,412 B2 | 5/2015 | Nagarajan |
| 9,039,614 B2 | 5/2015 | Yuen et al. |
| 9,049,998 B2 | 6/2015 | Brumback et al. |
| 9,066,691 B2 | 6/2015 | Addison et al. |
| 9,091,715 B2 | 7/2015 | Alameh et al. |
| 9,110,259 B1 | 8/2015 | Black |
| 9,135,397 B2 | 9/2015 | Denyer et al. |
| 9,176,282 B2 | 11/2015 | Pottier |
| 9,217,669 B2 | 12/2015 | Wu et al. |
| 9,226,663 B2 | 1/2016 | Fei |
| 9,237,855 B2 | 1/2016 | Hong et al. |
| 9,241,635 B2 | 1/2016 | Yuen et al. |
| 9,314,197 B2 | 4/2016 | Eisen et al. |
| 9,348,154 B2 | 5/2016 | Hayakawa |
| 9,370,689 B2 | 6/2016 | Guillama et al. |
| 9,392,946 B1 | 7/2016 | Sarantos |
| 9,405,066 B2 | 8/2016 | Mahgerefteh |
| 9,423,418 B2 | 8/2016 | Alameh et al. |
| 9,442,525 B2 | 9/2016 | Choi et al. |
| 9,510,790 B2 | 12/2016 | Kang et al. |
| 9,513,321 B2 | 12/2016 | Frangen |
| 9,515,378 B2 | 12/2016 | Prasad |
| 9,526,421 B2 | 12/2016 | Papadopoulos et al. |
| 9,526,433 B2 | 12/2016 | Lapelina et al. |
| 9,543,736 B1 | 1/2017 | Barwicz et al. |
| 9,558,336 B2 | 1/2017 | Lee |
| 9,597,014 B2 | 3/2017 | Venkatraman et al. |
| 9,603,569 B2 | 3/2017 | Mirov et al. |
| 9,620,931 B2 | 4/2017 | Tanaka |
| 9,643,181 B1 | 5/2017 | Chang |
| 9,743,838 B2 | 8/2017 | Richards |
| 9,763,607 B1 | 9/2017 | Acosta et al. |
| 9,766,370 B2 | 9/2017 | Aloe et al. |
| 9,782,128 B2 | 10/2017 | Lee et al. |
| 9,784,829 B2 | 10/2017 | Zeng |
| 9,804,027 B2 | 10/2017 | Fish et al. |
| 9,829,631 B2 | 11/2017 | Lambert |
| 9,833,179 B2 | 12/2017 | Ikeda |
| 9,861,286 B1 | 1/2018 | Islam |
| 9,875,560 B2 | 1/2018 | Rajagopaian |
| 9,880,352 B2 | 1/2018 | Florjanczyk |
| 9,943,237 B2 | 4/2018 | Baker et al. |
| 9,946,020 B1 | 4/2018 | Horth |
| 9,948,063 B2 | 4/2018 | Caneau et al. |
| 9,952,433 B2 | 4/2018 | Um et al. |
| 9,974,466 B2 | 5/2018 | Kimmel |
| 10,009,668 B2 | 6/2018 | Liboiron-Ladouceur |
| 10,016,613 B2 | 7/2018 | Kavounas et al. |
| 10,032,557 B1 | 7/2018 | Bossetti |
| 10,092,197 B2 | 10/2018 | Han |
| 10,117,587 B2 | 11/2018 | Han |
| 10,132,996 B2 | 11/2018 | Lambert |
| 10,136,859 B2 | 11/2018 | Cutaia |
| 10,165,954 B2 | 1/2019 | Lee |
| 10,178,959 B1 | 1/2019 | Homyk |
| 10,181,021 B2 | 1/2019 | Verkatraman et al. |
| 10,188,330 B1 | 1/2019 | Kadlec et al. |
| 10,203,454 B2 | 2/2019 | Liu |
| 10,238,351 B2 | 3/2019 | Halperin et al. |
| 10,241,476 B1 | 3/2019 | Moten |
| 10,243,684 B2 | 3/2019 | Wen |
| 10,271,745 B2 | 4/2019 | Gu et al. |
| 10,278,591 B2 | 5/2019 | Gil |
| 10,278,592 B2 | 5/2019 | Fish et al. |
| 10,285,898 B2 | 5/2019 | Douglas et al. |
| 10,310,196 B2 | 6/2019 | Hutchison |
| 10,317,200 B1 | 6/2019 | Han et al. |
| 10,372,160 B2 | 8/2019 | Lee et al. |
| 10,376,164 B2 | 8/2019 | Presura et al. |
| 10,417,513 B2 | 9/2019 | Lee |
| 10,429,597 B2 | 10/2019 | ten Have et al. |
| 10,433,739 B2 | 10/2019 | Weekly et al. |
| 10,444,067 B2 | 10/2019 | Hsu et al. |
| 10,485,437 B2 | 11/2019 | Wei et al. |
| 10,485,478 B1 | 11/2019 | Mirov |
| 10,529,003 B2 | 1/2020 | Mazed |
| 10,537,270 B2 | 1/2020 | Sarussi et al. |
| 10,559,708 B2 | 2/2020 | Chua |

(56) References Cited

U.S. PATENT DOCUMENTS

| | | |
|---|---|---|
| 10,586,525 B1 | 2/2020 | Wu et al. |
| 10,599,192 B2 | 3/2020 | Younes et al. |
| 10,610,157 B2 | 4/2020 | Pandya et al. |
| 10,627,783 B2 | 4/2020 | Rothkopf |
| 10,645,470 B2 | 5/2020 | Baxi et al. |
| 10,646,145 B2 | 5/2020 | Pekander et al. |
| 10,687,718 B2 | 6/2020 | Allec et al. |
| 10,702,211 B2 | 7/2020 | Clavelle et al. |
| 10,732,574 B2 | 8/2020 | Shim et al. |
| 10,736,552 B2 | 8/2020 | Ferber et al. |
| 10,741,064 B2 | 8/2020 | Schwarz et al. |
| 10,760,955 B2 | 9/2020 | Chu et al. |
| 10,795,508 B2 | 10/2020 | Han et al. |
| 10,799,133 B2 | 10/2020 | Lee |
| 10,806,386 B2 | 10/2020 | Lobbestael et al. |
| 10,843,066 B2 | 11/2020 | Nicoli |
| 10,852,492 B1 | 12/2020 | Vermeulen et al. |
| 10,874,348 B1 | 12/2020 | Han et al. |
| 10,918,322 B2 | 2/2021 | Shao |
| 10,966,643 B1 | 5/2021 | Vavadi |
| 10,996,399 B2 | 5/2021 | Yang et al. |
| 11,018,524 B2 | 5/2021 | Simpson |
| 11,035,318 B2 | 6/2021 | Kuboyama et al. |
| 11,076,769 B2 | 8/2021 | Lee |
| 11,145,310 B2 | 10/2021 | Sakurai |
| 11,156,497 B2 | 10/2021 | Bismuto et al. |
| 11,158,996 B2 | 10/2021 | Bismuto et al. |
| 11,190,556 B2 | 11/2021 | Meiyappan et al. |
| 11,224,381 B2 | 1/2022 | McHale et al. |
| 11,226,459 B2 | 1/2022 | Bishop et al. |
| 11,309,929 B2 | 4/2022 | Wong |
| 11,432,766 B2 | 9/2022 | Pandya et al. |
| 11,482,513 B2 | 10/2022 | Krasulick et al. |
| 11,511,440 B2 | 11/2022 | Polanco et al. |
| 11,561,515 B2 | 1/2023 | Beyhs |
| 11,857,298 B1 | 1/2024 | Allec et al. |
| 2002/0029128 A1 | 3/2002 | Jones et al. |
| 2005/0053112 A1 | 3/2005 | Shams-Zadeh-Amiri |
| 2005/0063431 A1 | 3/2005 | Gallup et al. |
| 2005/0078134 A1* | 4/2005 | Igarashi .............. B41J 2/04573 347/14 |
| 2006/0002443 A1 | 1/2006 | Farber et al. |
| 2006/0253010 A1 | 11/2006 | Brady et al. |
| 2007/0047157 A1* | 3/2007 | Miyahara .............. B41J 29/393 360/324.11 |
| 2008/0044128 A1 | 2/2008 | Kish et al. |
| 2008/0049980 A1 | 2/2008 | Castaneda et al. |
| 2008/0310470 A1 | 12/2008 | Ooi et al. |
| 2010/0158067 A1 | 6/2010 | Nakatsuka et al. |
| 2012/0119920 A1 | 5/2012 | Sallop et al. |
| 2012/0310062 A1 | 12/2012 | Li et al. |
| 2013/0030267 A1 | 1/2013 | Lisogurski et al. |
| 2014/0029943 A1 | 1/2014 | Mathai et al. |
| 2014/0069951 A1 | 3/2014 | Schmidt et al. |
| 2014/0073968 A1 | 3/2014 | Engelbrecht et al. |
| 2015/0054348 A1 | 2/2015 | Akiya |
| 2015/0099943 A1 | 4/2015 | Russell |
| 2015/0160622 A1* | 6/2015 | Kim ....................... G04G 21/02 368/9 |
| 2015/0164352 A1 | 6/2015 | Yoon et al. |
| 2015/0293228 A1* | 10/2015 | Retterath .............. G01S 17/931 356/5.01 |
| 2016/0129279 A1 | 5/2016 | Ferolito |
| 2016/0224750 A1 | 8/2016 | Kethman et al. |
| 2016/0278712 A1 | 9/2016 | Sagara et al. |
| 2016/0296174 A1 | 10/2016 | Isikman et al. |
| 2017/0095216 A1 | 4/2017 | Laty |
| 2017/0115825 A1* | 4/2017 | Eriksson ............... G06F 3/0428 |
| 2017/0119262 A1 | 5/2017 | Shim et al. |
| 2017/0135633 A1 | 5/2017 | Connor |
| 2017/0164878 A1 | 6/2017 | Connor |
| 2017/0172476 A1 | 6/2017 | Schilthuizen |
| 2017/0251963 A1 | 9/2017 | Hashimoto et al. |
| 2017/0347902 A1 | 12/2017 | Van Gool et al. |
| 2018/0014785 A1 | 1/2018 | Li |
| 2018/0073924 A1* | 3/2018 | Steinmann ............ G01J 1/0271 |
| 2018/0227754 A1 | 8/2018 | Paez Velazquez |
| 2018/0235483 A1 | 8/2018 | Mouradian |
| 2018/0344175 A1 | 12/2018 | Rulkov et al. |
| 2019/0015045 A1 | 1/2019 | Li |
| 2019/0018136 A1* | 1/2019 | Jacobs .................. G01S 7/4813 |
| 2019/0069781 A1 | 3/2019 | Kim et al. |
| 2019/0072912 A1 | 3/2019 | Pandya et al. |
| 2019/0083034 A1 | 3/2019 | Shim et al. |
| 2019/0090766 A1 | 3/2019 | Block et al. |
| 2019/0090806 A1 | 3/2019 | Clavelle et al. |
| 2019/0154439 A1* | 5/2019 | Binder .................. G01B 11/26 |
| 2019/0167124 A1 | 6/2019 | Verkruijsse et al. |
| 2019/0339468 A1 | 11/2019 | Evans et al. |
| 2019/0342009 A1 | 11/2019 | Evans et al. |
| 2020/0085374 A1 | 3/2020 | Lin et al. |
| 2020/0163616 A1 | 5/2020 | Sakaya |
| 2020/0253547 A1 | 8/2020 | Harris et al. |
| 2020/0297955 A1 | 9/2020 | Shouldice |
| 2021/0093237 A1 | 4/2021 | Venugopal et al. |
| 2021/0194481 A1 | 6/2021 | Rademeyer et al. |
| 2021/0278561 A1 | 9/2021 | Mehra et al. |
| 2022/0011157 A1 | 1/2022 | Bismuto et al. |
| 2022/0059992 A1 | 2/2022 | Hill et al. |
| 2022/0075036 A1* | 3/2022 | Zhou ....................... G01S 17/10 |
| 2022/0085231 A1 | 3/2022 | Liu et al. |
| 2022/0091333 A1 | 3/2022 | Wu |
| 2022/0099896 A1 | 3/2022 | Arbore et al. |
| 2023/0190167 A1 | 6/2023 | Jung |
| 2023/0404419 A1 | 12/2023 | Allec et al. |

FOREIGN PATENT DOCUMENTS

| | | |
|---|---|---|
| CN | 109589095 | 4/2019 |
| CN | 109645972 | 4/2019 |
| EP | 1403985 | 3/2004 |
| EP | 1432045 | 6/2004 |
| EP | 3451117 | 3/2019 |
| EP | 3561561 | 10/2019 |
| FR | 2949024 | 2/2011 |
| JP | S60127776 | 7/1985 |
| JP | S63177495 | 7/1988 |
| JP | 2000163031 | 6/2000 |
| JP | 2002342033 | 11/2002 |
| JP | 2008262118 | 10/2008 |
| KR | 20180042472 | 4/2018 |
| WO | WO 01/014929 | 3/2001 |
| WO | WO 02/011339 | 2/2002 |
| WO | WO 04/031824 | 4/2004 |
| WO | WO 05/091036 | 9/2005 |
| WO | WO 11/090274 | 7/2011 |
| WO | 13/173838 | 11/2013 |
| WO | WO 15/051253 | 4/2015 |
| WO | WO 15/094378 | 6/2015 |
| WO | WO 15/105881 | 7/2015 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 19/185903 | 10/2019 |
| WO | WO 20/106974 | 5/2020 |

OTHER PUBLICATIONS

U.S. Appl. No. 17/473,745, filed Sep. 13, 2021, Liu et al.
Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.
He et al., "Integrated Polarization Compensator for WDM Waveguide Demultiplexers," IEEE Photonics Technology Letters vol. 11, No. 2, Feb. 1999, pp. 224-226.
Kybartas et al., "Capacitive Sensor for Respiratory Monitoring," Conference "Biomedical Engineering," Nov. 2015, 6 pages.
Lapedus, "Electroplating IC Packages—Tooling challenges increase as advanced packaging ramps up," Semiconductor Engineering, https://semiengineering.com/electroplating-ic-packages, Apr. 10, 2017, 22 pages.

(56) References Cited

OTHER PUBLICATIONS

Materials and Processes for Electronic Applications, Series Editor: James J. Licari, AvanTeco, Whittier, California, Elsevier Inc., 2009, 20 pages.
Worhoff et al., "Flip-chip assembly for photonic circuits," MESA+ Research Institute, University of Twente, Integrated Optical MicroSystems Group, The Netherlands, 2004, 12 pages.

* cited by examiner

MULTI-PATHWAY DISTANCE MEASUREMENTS FOR OPTICAL SENSORS

FIELD

The present disclosure generally relates to optical distance measuring devices, electronic devices that include such optical distance measuring devices, and methods of their operation.

BACKGROUND

Electronic devices are commonplace in today's society. Example electronic devices include smart watches, wearable health sensing devices, cell phones, tablet computers, personal digital assistants, and the like. More particularly, wearable devices include electronic devices such as electronic watches, smart watches, smart phones, health monitoring devices, fitness monitoring devices, audio playback devices, and so on.

Such devices may have one or more sensors or sensor systems that detect when an object exterior to the electronic device is within a certain distance. For example, a smart phone may have detectors that can aid in determining that the smart phone is horizontally placed on or near a flat surface, such as a charging mat. Other examples include smart watches or wearable health monitors that have sensors to detect that they are positioned on or near a user's body.

Such devices may use detection of proximity of an exterior object to enable or disable one or more functions. For example, a smart watch or a wearable health monitor may use proximity detection as part of a determination that it is on a user's body, and then enable or start monitoring, authentication, or sensing operations.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are electronic devices, systems, and methods of their operation. Such electronic devices may include optical or light-based components for estimating distance to, or detecting proximity to, an exterior object.

More specifically, described herein is an electronic device, comprising: a housing; a light emitter operable to emit light outward from or through the housing; a first light detector positioned within the housing at a first separation distance from the light emitter; a second light detector positioned within the housing at a second separation distance from the light emitter, the second separation distance different from the first separation distance; and a processor configured to estimate an object distance by: determining a first signal strength of the first light detector; determining a second signal strength of the second light detector; and using the first signal strength and the second signal strength to estimate the object distance; wherein: the object distance is a distance from the electronic device to an object.

Also described herein is an electronic device, comprising: a housing; a light emitter operable to emit light outward from or through the housing; a first pair of light detectors positioned on a first side of an axis on which the light emitter lies; a second pair of light detectors positioned on a second side of the axis; and a processor operably connected to the light emitter and the first and second pairs of light detectors; wherein: the processor estimates a first object distance from the electronic device to an object exterior to the electronic device at least partially by determining a ratio of signal strengths of the first pair of light detectors; and the processor estimates a second object distance from the electronic device to the object exterior to the electronic device at least partially by determining a ratio of signal strengths of the second pair of light detectors.

The present disclosure also describes a method of operating an electronic device, comprising: estimating that an object exterior to the electronic device is within a critical distance of the electronic device by: emitting, from a light emitter, an emitted light outward from or through a housing of the electronic device; determining a first signal strength produced by a first light detector that varies with a portion of the emitted light reflected from the object and received by the first light detector; determining a second signal strength that varies with another portion of the emitted light reflected from the object and received by the second light detector; determining a ratio of the first signal strength and the second signal strength; determining that the object is within the critical distance when the ratio is less than a critical distance value; and enabling an operation of the electronic device when the object is within the critical distance.

These and other embodiments are more fully described in the detailed description that follows.

BRIEF DESCRIPTION OF THE DRAWINGS

The disclosure will be readily understood by the following detailed description in conjunction with the accompanying drawings, wherein like reference numerals designate like structural elements.

Figure 1A:
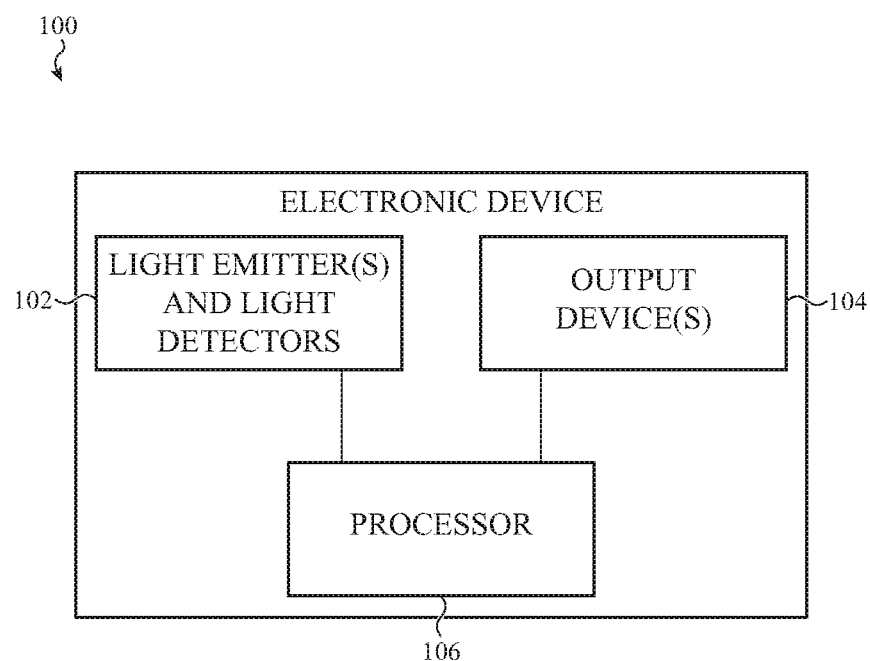
FIG. 1A is a functional block diagram of certain components of a device or system, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to electronic devices, light or optical distance estimating or measuring components or systems for electronic devices, and methods of operation of such electronic devices or components or systems. In some embodiments, the electronic devices are configured to be worn on, or in proximity to, a user. Examples of such wearable electronic devices include a smart watch, a smart phone, a health monitoring device, or another wearable device. Such wearable electronic devices may benefit from detecting whether they are being worn by a user. Such a detection may be based on an estimated proximity of the electronic device to an exterior object, such as a user's wrist, arm, leg, or other position. Even electronic devices not primarily designed to be worn may benefit from detection of a proximity to an exterior object. Accordingly, embodiments described herein may detect or estimate a distance between an electronic device and an object external to the electronic device.

Typically, distance estimations are performed by emitting light from an emitter of an electronic device toward an object being sensed, receiving emitted light that has been reflected from the object at a first and a second light detector, and using the signal strength of the light received at the first detector and the signal strength of the light received at the second detector to calculate a ratio of signal strengths. This ratio may then be correlated to a distance between the electronic device and the object. It should be appreciated that the emitter emits light of a certain wavelength and the light detectors detect light of that wavelength. Some embodiments may employ or incorporate light detectors that are sensitive substantially only to the wavelength(s) emitted by the light emitter(s), while other may incorporate or employ light detectors that sense a wider range of wavelengths. In embodiments with light detects that sense wider range of wavelengths than are outputted by the light emitter, techniques (such as dark channel subtraction, modulation/demodulation, and the like) or filters (including coatings) may be used to separate emitted light from ambient light. This ensures the light detectors receive and are sensitive to a signal (e.g., light) from the emitter rather than ambient light.

Expanding on this example, the first light detector is positioned a first separation distance from the emitter and the second light detector is positioned a second separation distance from the emitter. The first separation distance may be shorter than the second separation distance, such that light travels further from the emitter, to the object, and to the second light detector than light traveling from the emitter, to the object, and to the first light detector. Accordingly, the first light detector may be referred to herein as a "short length" light detector while the second light detector is referred to as a "long length" light detector. Similarly, the routing of the light from the emitter to a light detector may be referred to as a "light path."

Generally, there are two separate distances that affect an amount of light from an emitter that is received by a light detector. First is the separation distance between the emitter and the detector, as discussed above. The further the detector is physically located from the emitter, the less light the detector receives from the emitter. Given a fixed distance between an electronic device and an object being sensed, a short length light detector will almost always receive more light from an emitter than will a long length light detector. Thus, presuming the electronic device is not tilted or offset from the object being sensed, a signal strength at the short length light detector will almost always exceed a signal strength at the long length light detector at any given moment.

More emitted light is typically received at the short length light detector than at the long length light detector, insofar as less light is lost to scattering, diffusion, absorption, and the like. It may be appreciated that a signal strength of the light received at the short length detector is greater than a signal strength of light received at the long length detector as a result. Likewise, the signal strength of a signal generated by the short length detector is correspondingly greater than the signal strength of a signal generated by the long length detector.

The second distance that affects the amount of light from an emitter that is received by a light detector is the distance between the electronic device and the object reflecting light from the emitter (e.g., the object being sensed). This may be referred to as the "object distance." As the object distance increases, less light is received by a light detector since the light path increases. That is, light emitted by the emitter travels further to impinge on the object, as well as further to return to the detector. Longer light paths mean more light is scattered away from the detector. Thus, as the object distance increases, the signal strength for a detector usually decreases.

The electronic device may generate a ratio of the long length detector's signal strength to the short length detector's signal strength. As the object distance increases, this ratio approaches one. Likewise, as the object distance decreases, this ratio approaches zero. Put another way, the further the emitter/electronic device is from the object, the closer the signal strength of both light detectors becomes as the light paths to each detector near the same value. Likewise, as the emitter (and thus the electronic device) approaches the object, the object distance decreases and relative differences in the short and long light paths become greater.

Given this relationship between signal strengths and both the separation distance and object distance, the electronic device may use the ratio of signal strengths to estimate distance. Further, a ratio of the two signal strengths is used because the ratio is dimensionless and so is not dependent on any particular quality of the object reflecting light. Thus, embodiments described herein may accurately measure or estimate a distance to two objects that have different light absorptive, diffusive, and/or scattering properties with the same degree of accuracy.

Certain embodiments described herein may use multiple pairs of light detectors to determine an object distance. In various embodiments, a light emitter positioned in or on a housing, including on a surface of the electronic device's housing, emits light outward from the electronic device. If the exterior object is near or proximate to the electronic device, such as within a certain range of object distances, the emitted light may reflect from the object both to a first pair of light detectors and to a second pair of light detectors. The first and second pairs of light detectors are positioned at different separation distances from the emitter, and thus have different light paths. The electronic device may measure signal strengths of the light received at each of the pairs of detectors and generate a ratio of the signal strength of the first pair of light detectors to the signal strength of the second pair of detectors. This ratio of signal strengths may be correlated with a distance of the exterior object from the electronic device, for example by relating the ratio to a proximity curve that correlates the ratio to a distance, or may otherwise be correlated to a distance. Further, because the signal strengths at or generated by each detector in the pair(s) of detectors is used to estimate distance to an object, the estimated object distance does not change as the reflective, absorptive, or scattering properties of the object change.

Additional and/or alternative embodiments may use more than two light detectors, more than two pairs of light detectors, and/or more than one light emitter. In the methods described, an electronic device using such object distance detection or measuring embodiments may alter an operational state based on the detections or measurements.

Further, a tilt, skew, offset, or other alignment of an electronic device may be determined by comparing signal strength ratios of multiple sets of light detectors, such as multiple pairs of light detectors. Since the detectors are generally coplanar and closer light detectors have higher signal strengths (as they receive more light reflected from an object), the relative signal strengths of the pairs of light detectors indicate the orientation of the electronic device's housing relative to the object.

Although embodiments discuss the use of signal strength ratios, it should be appreciated that other constructs may be employed in lieu of a ratio or signal strength. Certain embodiments may employ any suitable value, measurement, or characteristic of a signal (including frequency, wavelength, phase, and so on) in a distance estimation. Likewise, any suitable construct may be derived from such signal characteristics and used to estimate distance. A "construct" is a value derived by applying a mathematical function to one or more signal characteristics of one or more signals. Thus, a signal strength (e.g., amplitude) is a signal characteristic, while a ratio of signal strengths is a construct. Other constructs may include derivatives, integrals, rates, proportions, summations, squares, roots, or powers of other constructs, "constructs of constructs" (e.g., a derivative of a ratio) and so on. Additionally, a "signal strength ratio," as used herein, may refer to a ratio of signal strengths that are measured or calculated at a single point in time, measured or calculated from an averaged or weighted set of signal strengths measured across a time period, or some particular measurement of signal strength (such as maximum signal strength, minimum signal strength, average signal strength, highest confidence signal strength, and so on).

These and other embodiments are discussed below with reference to FIGS. 1A-8. However, those skilled in the art will readily appreciate that the detailed description given herein with respect to these Figures is for explanatory purposes only and should not be construed as limiting. Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

In the following Figures, like reference numerals are used to designate similar or related components or features. However, it is not implied that such components or features are necessarily identical. Variations of those components or features, as would be known to one skilled in the art, are within the scope of the disclosure for the components or features having like reference numerals.

FIG. 1A shows a functional block diagram of an electronic device (or device) 100. In some examples, the device 100 may be a wearable device, such as an electronic watch, smart watch, smart phone, health monitoring device, fitness monitoring device, or audio playback device that is wearable on a wrist of a user. The device 100 may also or alternatively be wearable on an ankle, arm, forehead, waist, or other body part, or may be positionable or attachable to another device (e.g., a seat cushion or bed). The device 100 may include one or more input devices 102, one or more output devices 104, and a processor 106. As used herein, a "processor," such as the processor 106, may refer to any of a singular processor, a set of multiple processors, a microprocessor or microcontroller, a field programmable gate array, and/or another type of processor in combination with supporting circuitry. Broadly, the input device(s) 102 may detect various types of user input or sense various types of parameters, and the output device(s) 106 may provide various types of outputs.

In some cases, user input and/or parameters that are sensed by the input device(s) 102 may be used to control one or more settings, functions, or other aspects of the device 100, or may be provided to a remote device. Particular examples of input devices 102 include light emitters and light detectors as discussed in the embodiments described below. In some cases, one or more of the output devices 104 may be configured to provide output that is dependent on, or manipulated in response to, the user input and/or parameters sensed by one or more of the input devices 102. The outputs provided by one or more of the output devices 104 may also be responsive to, or initiated by, a program or application that is executed by the processor 106 and/or an associated companion device. The output devices 104 may include any suitable components for generating or communicating outputs. Examples of output devices 104 include audio output devices (e.g., speakers), visual output devices (e.g., lights, displays, or other electromagnetic radiation emitters), tactile output devices (e.g., haptic output devices), communication devices (e.g., wired or wireless communication devices), and so on, or some combination thereof. Each output device 104 may be configured to receive signals, data, or instructions from the processor 106 and/or one or more of the input devices 102, and to provide one or more outputs dictated by the signals, data, or instructions.

The processor 106 may be operably coupled to the input devices 102 and the output devices 104. The processor 106 may receive inputs (e.g., signals, statuses, and/or measurements) directly or indirectly from the input device(s) 102, in response to user input and/or parameters sensed by the input device(s) 102. In some cases, the processor 106 may interpret the inputs. In response to the inputs, or interpreted inputs, the processor 106 may maintain or alter one or more settings, functions, or aspects of the device 100 and, in some cases, the processor 106 may provide signals, data, or instructions to one or more of the output devices 104. In some cases, the processor 106 may provide signals, data, or instructions to one or more of the output devices 104 independently of any input received from an input device 102. A signal, data, or instruction provided to an output device 104 may cause the output device 104 to generate one or more outputs (e.g., an audio output, a visual output, a tactile output, one or more signals or instructions, and so on). Examples of suitable processors are discussed in more detail below with reference to FIG. 1B.

Figure 1B:
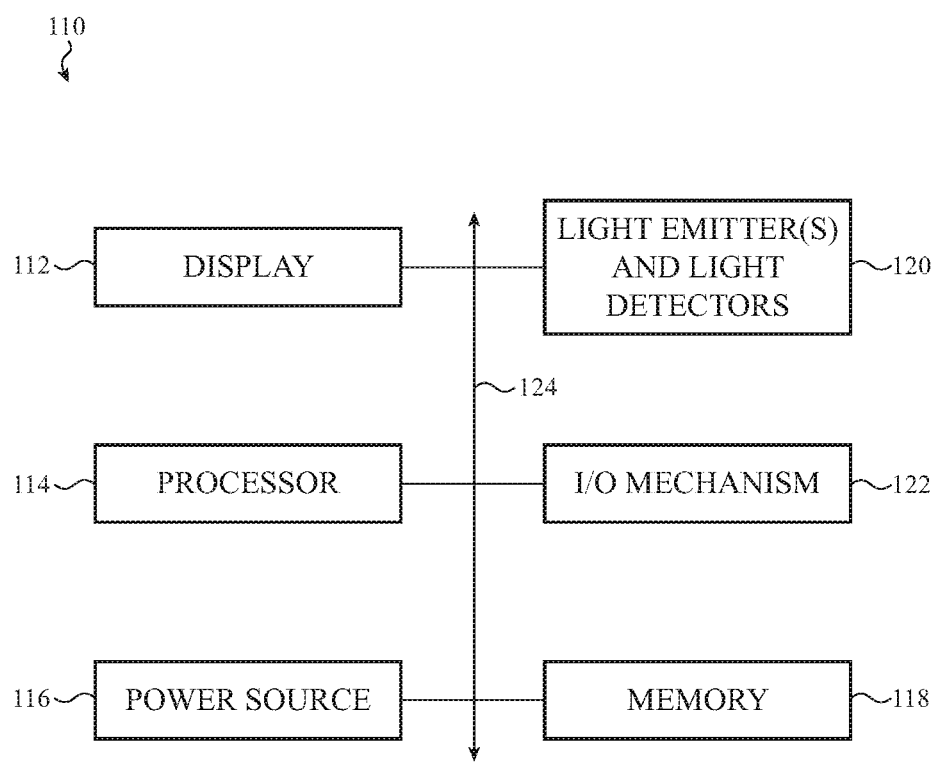
FIG. 1B is an electrical connection block diagram of certain components of an electronic device or system, according to an embodiment.

FIG. 1B shows an example electrical block diagram of an electronic device 110, such as electrical device 100 and the electronic devices described in the embodiments below. The electronic device 110 may include an electronic display 112 (e.g., a light-emitting display), a processor 114, a power source 116, a memory 118 or storage device, a subsystem 120 of light emitters and light detectors, or an input/output (I/O) mechanism 122 (e.g., an input/output device, input/output port, or haptic input/output interface). The processor 114 may control some or all of the operations of the electronic device 110. The processor 114 may communicate, either directly or indirectly, with some or all of the other components of the electronic device 110. For example, a system bus or other communication mechanism 124 can provide communication between the electronic display 112, the processor 114, the power source 116, the memory 118, the subsystem 120 of light emitters and light detectors, and the I/O mechanism 122.

The processor 114 may be implemented as any electronic device capable of processing, receiving, or transmitting data or instructions, whether such data or instructions are in the form of software or firmware or otherwise encoded. For example, the processor 114 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. It should be noted that the components of the electronic device 110 can be controlled by multiple processors. For example, select components of the electronic device 110 (e.g., subsystem 120 of light emitters and light detectors) may be controlled by a first processor and other components of the electronic device 110 (e.g., the electronic display 112) may be controlled by a second processor, where the first and second processors may or may not be in communication with each other.

The power source 116 can be implemented with any device capable of providing energy to the electronic device 110. For example, the power source 116 may include one or more batteries or rechargeable batteries. Additionally or alternatively, the power source 116 may include a power connector or power cord that connects the electronic device 110 to another power source, such as a wall outlet.

The memory 118 may store electronic data that can be used by the electronic device 110. For example, the memory 118 may store electrical data or content such as, for example, audio and video files, documents and applications, device settings and user preferences, timing signals, control signals, and data structures or databases. The memory 118 may include any type of memory. By way of example only, the memory 118 may include random access memory, read-only memory, flash memory, removable memory, other types of storage elements, or combinations of such memory types.

The electronic device 110 may also include a subsystem 120 of light emitters and light detectors, potentially positioned almost anywhere on the electronic device 110. In some cases, the subsystem 120 may include one or more electromagnetic radiation emitters and detectors, positioned and/or configured as described with reference to any of FIGS. 2A-8.

The I/O mechanism 122 may transmit or receive data from a user or another electronic device. The I/O mechanism 122 may include the electronic display 112, a touch sensing input mechanism (such as a touch-sensitive display, button, or portion of a housing), a crown, one or more buttons (e.g., a graphical user interface "home" button), one or more cameras (including an under-display camera), one or more microphones or speakers, one or more ports, such as a microphone port, and/or a keyboard, all of which are optional. Additionally or alternatively, the I/O mechanism 122 may transmit electronic signals via a communications interface, such as a wireless, wired, and/or optical communications interface. Examples of wireless and wired communications interfaces include, but are not limited to, cellular and Wi-Fi communications interfaces.

Figure 2A:
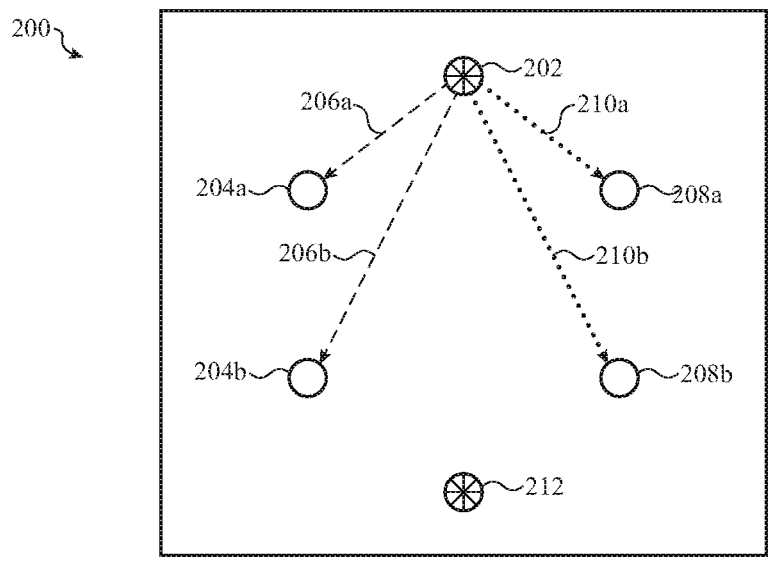
FIG. 2A illustrates a plan view of a housing of an electronic device with light transmitters and light detectors, according to an embodiment.

FIG. 2A shows a plan view of a housing 201 of an electronic device 200. The housing 201 may be define an exterior (including a back side) of a smart watch, a wearable health monitor that attaches to a user, a smart phone, or another electronic device. The back side of the electronic device 200 is shown in the plan view as a rectangle, but other shapes are possible. The electronic device 200 includes various optical and other components that it may use to determine proximity of an exterior object or estimate the object distance.

The electronic device 200, as shown, includes a first light emitter 202. The light emitter 202 may be a light emitting diode, a laser diode, or another component able to emit light. The light emitter 202 may be an infrared laser diode, though this is not required in the embodiments. The wavelength or spectral range of the light emitted by the first light emitter 202 may be fixed or variable, such as depending on a received input or control signal. The light emitter 202 may be able to emit light, which may be triggered by received input or control signals, such as from the processor 106, and may be emitted sequentially, and may have a variable duration and duty cycle. The light emitter may be positioned at, in, or proximate to the housing 201 so as to emit light in a certain direction outward from the electronic device 200. In some embodiments, the light emitter 202 may be a laser emitter, and may be mounted in a movable fixture, such as a piezoelectric or piezo-resistive fixture, that allows the emitted laser light to be steered.

In some embodiments, the light emitters (and/or the detectors discussed below) may be positioned within the housing 201 or beneath a cover attached to, or forming part of, the housing. This cover may be formed from glass, sapphire, plastic, crystal, or the like. Either or both of the housing or such an element may be optically transparent in a visible spectrum, or may be partly transparent at infrared, ultraviolet, and/or other wavelengths while being visibly opaque. In some examples, the housing or cover (or other suitable element) may be optically and/or infrared transparent but covered with an optical and/or infrared barrier, such as a coating or ink. This barrier may define one or more windows through which light may enter or exit the housing 201 or cover. As one non-limiting example, the barrier may define a window over one or more emitters as discussed herein, thus permitting light to exit the emitter and the device 400. It should be appreciated that the window may be fully defined by the barrier or may be defined by cooperation between the barrier and the housing of cover on which the barrier is deposited (e.g., the housing or cover may be thinned, raised, stepped, or otherwise configured to facilitate light transmission therethrough or provide a demarcation for the barrier), although this is not necessary. Although this description is given with respect to FIG. 2A, it should be appreciated that it is equally applicable to all embodiments discussed herein, specifically including those of FIGS. 2B-5.

The electronic device 200 also includes two pairs of light detectors: the first pair 204a and 204b, and the second pair 208a and 208b. Each of the four light detectors 204a, 204b, 208a, and 208b may be implemented using known photon or light detection technologies, such as CMOS photodetectors, photodiodes, or another technology. The four light detectors 204a, 204b, 208a, and 208b may be implemented with different technologies. The four light detectors 204a, 204b, 208a, and 208b may be positioned proximate to the housing 201, such as by being coplanar with the housing 201 of the electronic device 200, or may be positioned within the housing 201. In some cases, a glass, sapphire, or crystal cover or element may define a portion of, or may be affixed to or over, the housing 201. The four light detectors 204a, 204b, 208a, and 208b may detect light having a specific wavelength or within a specific wavelength range, and may generate a signal having a signal strength that varies with an amount of light that is emitted by the emitter and detected or received by the light detector. Put another way, the signal strength may increase as more emitted light is received by a light detector 204a, 204b, 208a, 208b and decrease as less emitted light is received by a light detector. One or more of the four light detectors 204a, 204b, 208a, and 208b may be positioned so as to preferentially detect light entering from within a limited solid angle, such as light entering from the direction of the light emitter 202. In some embodiments, the light detectors receive light through the housing 201, a back cover, or the like. Further, although the light detectors are visible in FIGS. 2A-2B, they may be hidden from view not only by the housing or cover, but also by an ink or coating that is visually opaque but passes light in the wavelengths emitted by the light emitters 202.

Signals (such as voltage or current signals) produced by any of the four light detectors 204a, 204b, 208a, and 208b in response to detection of light, and their relative signal strengths, may be received and processed by control electronics within the electronic device 200, such as the processor 106. It should be appreciated that the signal strengths used to determine a ratio, and thus a distance to an object (e.g., an object distance), may be either a signal strength of light received by a light detector or a signal strength of a signal generated by a light detector in response to receiving light. In some embodiments, constructs other than ratios may be used.

One or more of the four light detectors 204a, 204b, 208a, and 208b may have filters at, or in the housing 201 to remove or reduce impinging light outside the wavelength range of light emitted by the light emitter 202. These filters may be in addition to the coating described above, or the coating may function as such a filter.

The first pair of light detectors 204a and 204b are positioned in or on the housing 201 at different respective separation distances 206a and 206b from the light emitter 202. In the embodiment shown, the separation distance 206a is less than the separation distance 206b (e.g., the separation distance 206 is a short length and the separation distance 206b is a long length). The first pair of light detectors 204a and 204b need not be collinear with the light emitter 202, though they may be. Similarly, the second pair of light detectors 208a and 208b are positioned in or on the housing 201 at different respective separation distances 210a and 210b from the light emitter 202. In the embodiment shown, the separation distance 210a is a short length while the separation distance 210b is a long length. Again, the second pair of light detectors 208a and 208b need not be collinear with the light emitter 202, though they may be. In the embodiment shown, the separation distance 206a is equal (or nearly equal) to the separation distance 210a, and the separation distance 206b is equal (or nearly equal) to the separation distance 210b, but this is not required. When a detector or emitter is described as "in or on the housing," it should be appreciated this encompasses such detectors or emitters being in or on an element attached to the housing, such as a cover or crystal, as well.

The electronic device 200 may include a second light emitter 212 positioned on or proximate to the housing 201. The second light emitter 212 may emit light having the same, a similar, or a different wavelength or wavelength spectrum than that of the light emitted by the first light emitter 202. The first and second light emitters may emit light at different times, such that the light detectors 204a, 204b, 208a, 208b receive light from only one emitter at any given time; in embodiments where the first and second light emitters emit light having the same wavelength(s), such time multiplexing may be employed to ensure that light detectors receive light from only one emitter at any given instant (although this is not necessary). Alternately, the first and second emitters may emit light having different wavelengths simultaneously, and the light detectors may be configured to detect both wavelengths separately (or some detectors may detect light from the first emitter and some may detect light from the second emitter).

Figure 2B:
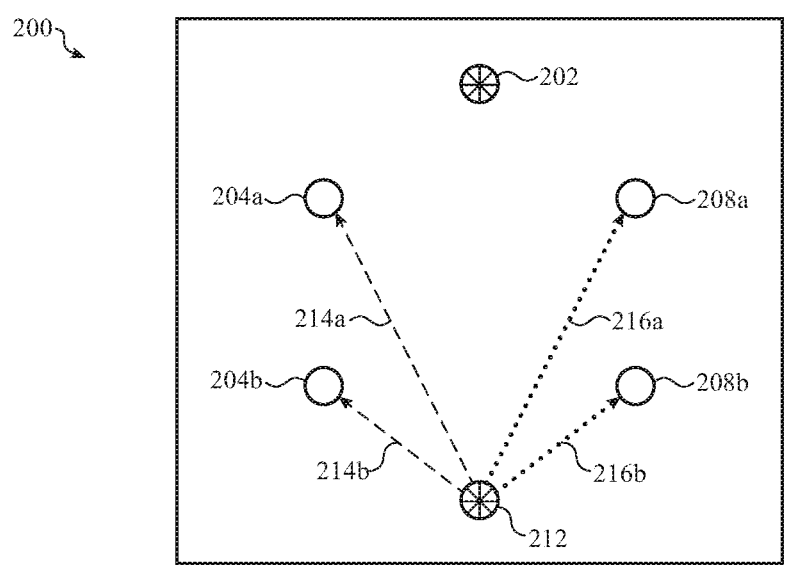
FIG. 2B illustrates a plan view of a housing of an electronic device with light transmitters and light detectors, according to an embodiment.

In the embodiment shown in FIGS. 2A-B, the light emitter 202 and light emitter 212 lie on an axis (vertical in the orientation shown in FIG. 2A). In the embodiment shown, the first pair of light detectors 204a, 204b are on a first side (left) of the axis, with the second pair of light detectors 208a, 208b on the opposite side (right) of the axis. By splitting the light detectors into pairs, with each pair on an opposing side of the axis, the embodiment may compare signal strength ratios (or other constructs) between pairs of detectors. That is, the signal strength ratio of each signal generated by a first pair of light detectors 204a, 204b may be compared against the signal strength ratio of each signal generated by a second pair of light detectors 208a, 208b.

Generally, as separation distances 206a, 206b, 210a, 210b increase, the corresponding path length increases, light impinging on a light detector 204a, 204b, 208a, 208b decreases and so the signal strength of a light detector will decrease. Likewise, as a separation distance decreases between an emitter and light detector, the detector receives more of the emitted light and so signal strength increases. Accordingly, short separation distances (and short path lengths) yield higher signal strength from a light detector while long separation distances (and long path lengths) yield lower signal strength from the light detector.

Further, in any given orientation, the signal strength ratio of one of the pairs of detectors will be less than the signal strength ratio of the other of the pair of detectors. Generally, the pair of detectors nearest an object will have the highest signal strength ratio, as the light travels a short distance both from the emitter to the object and when reflected from the object to the light detectors closest to the object. By comparing the signal strength ratios of the two pairs of detectors to one another, the electronic device may determine which pair of light detectors 204a, 204b, or 208a, 208b is closest to the object. This, in turn, may be used to determine a tilt of the electronic device with respect to the object; the side of the electronic device on which the pair of light detectors having the highest signal strength ratio is located is closest to the object. Again and as referenced above, each pair of detectors is defined by its location on one side or another of an axis passing through the emitter (e.g., on which the emitter lies).

It should be appreciated that the signal strength ratio need not be a ratio of signal strengths measured at an instantaneous point in time. Rather, the ratio may be derived from signal strengths that are measured or calculated at a single point in time, measured or calculated from an averaged or weighted set of signal strengths measured across a period, or some particular measurement of signal strength (such as maximum signal strength, minimum signal strength, average signal strength, highest confidence signal strength, and so on).

FIG. 2B shows a plan view similar to that of FIG. 2A for the electronic device 200. In FIG. 2B are shown the two respective separation distances 214a and 214b from a second light emitter 212 to the first pair of light detectors 204a and 204b. In the embodiment shown, the separation distance 214a is greater than the distance 214b. Similarly, FIG. 2B shows the two respective separation distances 216a and 216b from the light emitter 212 to the second pair of light detectors 208a and 208b. In the embodiment shown, the separation distance 216a is greater than the separation distance 216b.

In some embodiments, the separation distance 214a may be equal to the separation distance 206b (e.g., both are short lengths), the separation distance 214b may equal the separation distance 206a (e.g., both are long lengths), the separation distance 216a may equal the separation distance 210b (again, both are long lengths), and the separation distance 216b may equal the separation distance 210a (again, both are short lengths). Herein, "equal" will mean equal to within a numerical tolerance appropriate for the scale of the embodiment. However, these equalities are not required: they may not be implemented in other embodiments. Signal strength ratios (or other constructs) may be calculated for each of the light detector pairs 204a, 204b and 208a, 208b with respect to light emitted by the second light emitter 212. By comparing the signal strength ratio of a given pair of light detectors for light emitted by a first emitter 202 to that generated by light emitted by a second light emitter 212, the electronic device 200 may determine which light emitter 202, 212 is closer to an object reflecting light. Accordingly, an embodiment may determine tilt of the electronic device, with respect to the object, about two axes.

While the embodiments described in relation to FIGS. 2A-B have two light emitters 202 and 212, other embodiments may use a single light emitter on the housing 201 of the electronic device 200. Such single light emitter embodiments may use a single pair of light detectors, or two or more pairs of light detectors. The methods of operation of such alternative embodiments are related to the methods of operation discussed below, and will be apparent to one skilled in the art.

Figure 3:
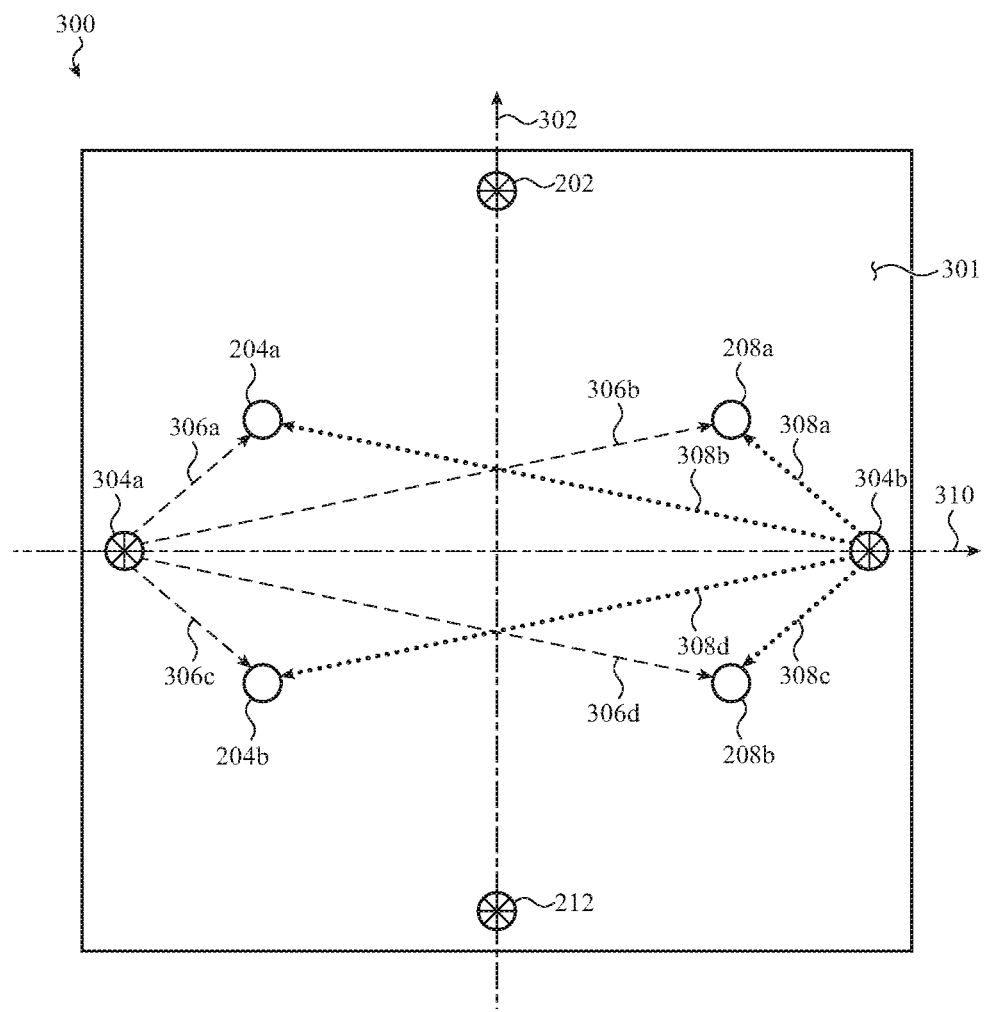
FIG. 3 illustrates a plan view of a housing of an electronic device with light transmitters and light detectors, according to an embodiment.

FIG. 3 shows a plan view of a surface of housing 301 of an electronic device 300. The surface may be a backside of a smart watch, a wearable health monitor that attaches to a user, a smart phone, or another electronic device. The backside of the electronic device 300 is shown in the plan view as a rectangle, but other shapes are possible. The electronic device 300 includes various optical and other components that it may use to determine proximity of an exterior object or estimate an object distance separating the exterior object from the electronic device. The electronic device 300 may be the same as, or a variation of, the electronic device 200 described in relation to FIGS. 2A-B The electronic device 300 includes a first pair of light emitters 202, 212 such as described in relation to FIGS. 2A-B. As shown, the first pair of light emitters 202, 212 are positioned oppositely along an axis 302. The electronic device 300 also includes a first pair of light detectors 204a, 204b such as described in relation to FIGS. 2A-B, and a second pair of light detectors 208a, 208b, such as described in relation to FIGS. 2A-B. In the configuration of the embodiment shown, the first pair of light detectors 204a, 204b is positioned on a first side of the axis 302, and the second pair of light detectors 208a, 208b is positioned on a second side of the axis 302. However, other embodiments may use other configurations. In the configuration shown, the first pair of light detectors 204a, 204b is positioned along a line segment approximately parallel to the axis 302, and similarly the second pair of light detectors 208a, 208b is positioned along another line segment approximately parallel to the axis 302. However, this is not required, and other embodiments may use different positioning configurations for the first and second pairs of light detectors.

The electronic device 300 also includes a third light emitter 304a and a fourth light emitter 304b positioned oppositely along a second axis 310. In the configuration shown, the second axis 310 is horizontal and intersects the first, vertical axis 302 approximately perpendicularly. However, in other configurations the second axis 310 may intersect the first axis 302 at an angle different from a right angle. In the configuration shown, the second axis 310 approximately bisects each of the first and second light emitter pairs, so that the light detectors 204a and 208a are on a first (top) side of the axis 310, and the light detectors 204b and 208b are on the opposite side of the second axis 310. However, this configuration is not required.

In the configuration shown, the light emitter 304a has separation distance 306a to the light detector 204a, and separation distance 306b to the light detector 208a, which is greater than the separation distance 306a. The light emitter 304a also has separation distance 306c to the light detector 204b, and separation distance 306d to the light detector 208b, which is greater than the separation distance 306c. For the sake of simplicity, the separation distances between emitters and detectors are shown rather than the corresponding light paths. Light paths between emitters and detectors will in actuality be angled paths that reflect off an object to be sensed by the device 300. This is shown, for example, in FIG. 5.

In the configuration shown, the light emitter 304b has separation distance 308a to the light detector 208a, and separation distance 308b to the light detector 204a, which is greater than the separation distance 308a. The light emitter 304b also has separation distance 308c to the light detector 208b, and separation distance 308d to the light detector 204b, which is greater than the separation distance 308a.

The operation of the emitters 304a, 304b and light detectors 204a, 204b, 208a, 208b is generally the same as described above with respect to FIGS. 2A-2B, and signal strength ratios for pairs of light emitters may be calculated in a similar fashion. Here, however, light detectors 204a, 208a may form a first pair while light detectors 204b, 208b form a second pair. This may permit the electronic device to determine and object distance, as well as tilt with respect to an object and about a second axis 310.

Figure 4:
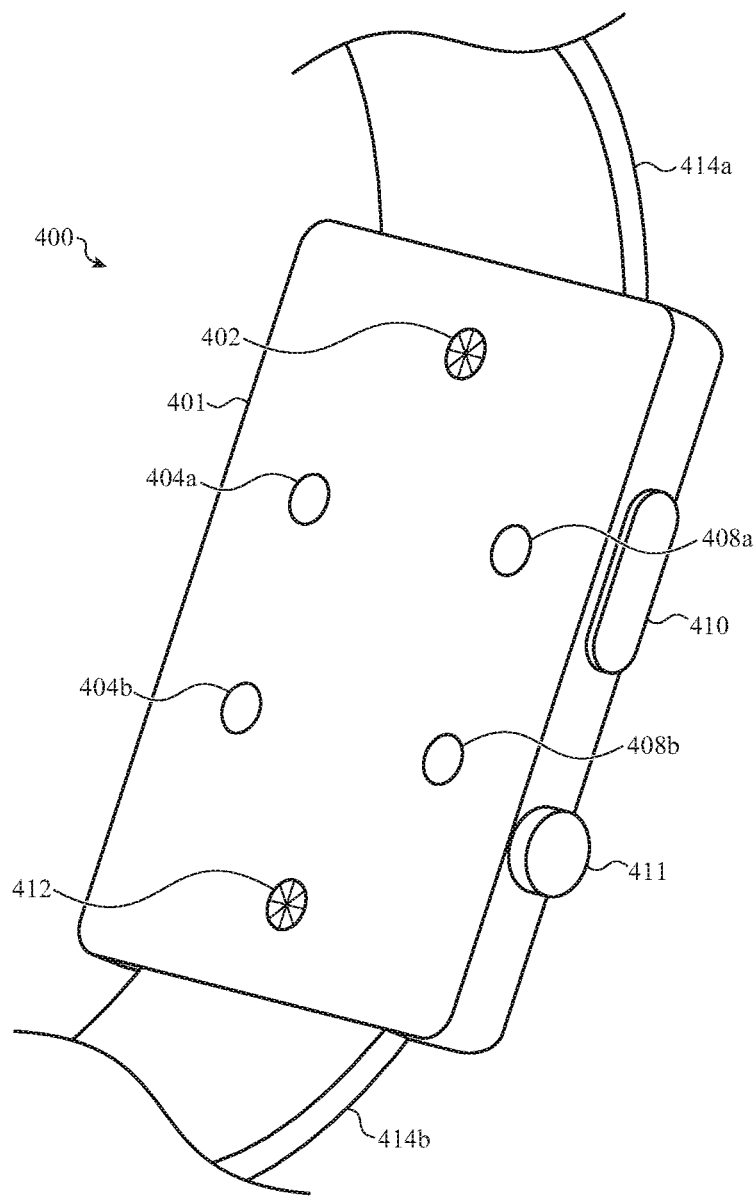
FIG. 4 illustrates a perspective view of a housing of an electronic device with light transmitters and light detectors, according to an embodiment.

FIG. 4 shows a perspective view of an exemplary electronic device 400 that incorporates the object distance measuring components described above (e.g., emitters and light detectors). In the example shown, the electronic device 400 is a smart watch, with the object distance measuring components emitting and receiving light through a backside of a housing 401. The backside of the housing 401 may be defined by a cover that is attached to, and cooperates with, a shell or other element forming a portion of the backside and/or the sidewalls and/or at least a portion of a front of the housing. The smart watch 400 may be worn by a user, such as on a wrist, by using a watch band, whose ends 414a, 414b are shown attached to opposite edges of the smart watch 400. The smart watch 400 may include one or more input or selection devices, such as a crown 411 or a button 410.

When worn, the backside surface 401 may be positioned next to, and oriented toward, a user's wrist or arm. The object distance measuring components and their methods of operation may allow the smart watch 400 to change operational states or modes depending on a determined or estimated proximity of the smart watch 400 to the user's wrist or arm. An "operational state," as used herein, may be an on-user mode, off-user mode, a power-on mode, a power-off mode, a mode in which full functionality of the electronic device is accessible, a mode in which limited or no functionality of the device is accessible, and so on. Certain example operational states are discussed more herein.

In the embodiment shown, the electronic device 400 includes the configuration of components described in relation to FIGS. 2A-B. More specifically, the electronic device 400 includes a first light emitter 402 and a second light emitter 412 defining an axis across the backside of the housing 401. A first pair of light detectors 404a, 404b is positioned on a first side of the axis, and a second pair of light detectors 408a, 408b is positioned on an opposite side of the axis.

One skilled in the art may recognize that the electronic device 400 may alternatively include the configuration of components described in relation to FIG. 3, or may include a single light emitter and a single pair (or more) of light detectors. In another embodiment, two light emitters are positioned as in FIG. 2A. A single pair of light detectors is positioned between the two light emitters along an axis on which the two light emitters lie. By positioning the light detectors and light emitters in a straight line, the impact of ambient light on operation of the system may be reduced as compared to other embodiments.

In yet another embodiment, two light emitters are positioned adjacent to each other at one end of the electronic device. For example, light emitters may be positioned at one end of the back side surface of the housing, such that each is on an opposite side of a central axis (similar to an axis intersecting emitters 402, 412 of FIG. 4). In such an embodiment, a single pair of light detectors may be positioned on the central axis. Each light emitter may emit its respective light at a non-right angle with respect to the central axis.

Any of the various configurations of light emitters and light detectors discussed above may be operated by the respective electronic device to determine if an exterior object is near or proximate to the electronic device, and/or to determine or estimate an object distance between the electronic device and the object.

As an overview, the determinations or estimations of object distances (and/or of tilts of an object with respect to the plane defined by the housing) are made by emitting light from at least one light emitter, and receiving respective reflections from the object at one (or more) pairs of light detectors. By using signal strengths corresponding to the amount of emitted light received at the light detectors, an object distance may be estimated. When the two light detectors are at different separation distances from the emitter, the path lengths traveled by light from the emitter to a respective light detector will be different and different amounts of light will be received by each of the light detectors, and different signal strengths will result. Thus, one of the light detectors will be a "short length" light detector as light travels a relatively short distance from the emitter, to the object, and back to this light detectors. A second light detector will be a "long length" detector as light travels a relatively long distance from the light emitter, to the object, and back to this second light detector. A ratio of signal strengths (either the "short length" light detector's signal strength divided by the "long length" light detector's signal strengths, or vice versa) may then be related to a proximity curve.

A proximity curve provides a relation from a value of the ratio to a value of an object distance, e.g., a distance between the electronic device and the exterior object. Such a proximity curve may be obtained either experimentally, or by geometric considerations. Further, a proximity curve may be implemented as a list of respective values of ratios and object distances, which may be implemented in the electronic device as a look-up table, with interpolation used for ratio values not in a list or table. In some embodiments, the proximity curve may include a critical distance value, which equates to a critical distance. The critical distance is the distance at which an electronic object may alter operations, states, functionality, power modes, or the like, as described herein. For example, when the electronic device is closer to the object than a critical distance, the electronic device may be in an "on-user" mode while the electronic device assumes an "off-user" mode when the distance between it and the object meets or exceeds the critical distance. On-user and off-user modes are described in more detail herein; generally (although not necessarily), full functionality of an electronic device is accessible to a user when the device is in the on-user state while limited or no functionality is accessible to the user when the device is in an off-user state. Alternatively, the proximity curve may be implemented as a function or algorithm, such as may be executed by a processor. Such a function may be obtained by a fit to a finite number of experimentally determined data points, or by geometric considerations.

When the ratio is compared to the proximity curve to obtain an object distance value, a determination may be made therefrom whether the object is within a critical distance of the electronic device. An operational state of the electronic device may then be adjusted depending on whether the exterior object is within the critical distance. For example, if the electronic device is operating under the assumption that it is away from or not on a user (e.g., not detecting heart beats, or locked from receiving user entries), and the object distance is then determined to be within the critical distance, the electronic device may initiate on-user operations (e.g., monitoring heart beasts, or initiating a logon operation). Alternatively, if the electronic device is operating under the assumption it is away from, or not positioned on, a user because the object distance is determined to be greater than the critical distance, the electronic device may maintain off-user status and respective operations. Analogous "maintain or change" operational decisions may occur if the electronic device is under the assumption that it is on a user or near the object.

As an additional operation, if a determination is made that the object is within the critical distance, the electronic device may perform a confirmation operation. For example, an initial determination made that the object is within the critical distance may be based on a ratio obtained from a first pair of light detectors. To verify this determination, the electronic device may use a ratio obtained from a second pair of light detectors, which may receive light from a second light emitter different from the light emitter used in the initial determination. The electronic device may enable (e.g., turn on) the second light emitter as part of the confirmation operation. Such a confirmation operation may be used in cases when the initial determination would cause the electronic device to alter its operational state. Similarly, if an initial determination is made that the object has moved (or is now) beyond the critical distance, the electronic device may confirm that initial distance determination using a second ratio based on the signal strengths of a second pair of light detectors, which also may be based on light from a second light emitter. As yet another example of a confirmation operation, the electronic device may form a second ratio using the initially used pair of light detectors but based on second signal strengths obtained from another light emitter, either from the initially used light emitter or from a second light emitter.

The electronic device may perform initial operations, such as calibration, with the light emitter(s) and light detectors. One calibration operation may use a measured scale factor for each optical path; e.g., at manufacture or periodically by a user, a calibration operation detects light from a standard reflective surface, and adjusts one or more scale factors for the signal strengths from the light detectors.

In operation, it may be that one or more signal strengths may be too low or too high to be considered reliable. In a first example, when the exterior object is in contact with the electronic device, little emitted light from one or more light emitters may not be received at the respective light detectors, such as due to complete absorption or surface irregularities of the exterior object, producing a too-low signal strength. In a second example, ambient light or another source of light may make one or more signal strengths noisy or close to or within a noise level. In a third example, a localized highly reflective area on the exterior object may cause the signal strength of the farther light to exceed that of the nearer light detector.

In these or other examples, the electronic device may determine that a ratio would not be reliable. The electronic device may then discard the ratio from use in determining whether the exterior object is within a critical distance. The electronic device may instead use a ratio of signal strengths from another pair of light detectors induced by light from another light emitter. Alternately, the electronic device may cause further emissions of light until a valid ratio is found.

Although embodiments are described herein as using a proximity curve to relate the signal strength ratio to the object distance, it should be understood that this is one sample way in which the signal strength ratio (or other construct) may be related or correlated to the object distance. Look-up tables or mathematical functions may be used in other embodiments and so the use of a proximity curve should be understood to be an example rather than a limitation.

Some embodiments may use more than one light emitter. For example, two light emitters may be positioned on or in the housing, as described above, and along an axis, with two pairs of light detectors configured as shown in FIG. 2A. The two light emitters may alternate to emit respective light. As each light is emitted, the respective light emitter may make its own determination or estimation of the object distance based on one or more signal strengths or ratios of signal strengths, as described herein. The two object distance estimates may be averaged, such as to reduce noise effects, or one may be discarded as an unreliable value (outside of an expected range). Further, it should be appreciated that, in embodiments employing two emitters, a single detector may receive light from each of the emitters at separate times; insofar as the signals received by the single light detector will vary, these signals may be used to determine a ratio and then estimate a distance to an object in a manner similar to that described herein with respect to embodiments having one emitter and multiple detectors.

In further methods, multiple light emitters may emit an alternating sequence of light (or may receive another triggering pattern for emissions from a processor), and for each light form a sequence of respective estimates of the object distance. This sequence of respective estimates of the object distance may be time-averaged (possibly with weights) to reduce the chance of spurious state changes.

In further methods, for embodiments with either a single light emitter or multiple light emitters, the light emitter(s) may emit a sequence of light pulses, with corresponding duty cycles. The light detectors may be enabled for reception only during each pulse emission period, or section thereof, to detect the pulse's reflections. The strengths of the light detectors' corresponding signals may be time-averaged to reduce false state change operations.

As another option for an embodiment having multiple light emitters, such as for the configuration shown in FIGS. 2A-B, a first light emitter may emit light directed to a first pair of light detectors whose two light detectors are at two different separation distances from that first light emitter (e.g., in FIG. 2A light emitter 202 is used with just light detectors 208a and 208b). A ratio of the signal strengths from just that pair of light detectors is used to obtain a first estimate of the object distance. Then, a second light emitter may emit another light directed to a second pair of light detectors whose two light detectors are also at two different separation distances from that second light emitter (e.g., in FIG. 2A, light emitter 212 is used with just light detectors 204a and 204b). A ratio of the signal strengths from just that second pair of light detectors is used to obtain a second estimate of the object distance. A difference in the estimates may be used to estimate a tilt, offset, or skew of the exterior object.

Still other embodiments may have a configuration that uses four light emitters, such as arranged in the "crossed-axis" configuration shown in FIG. 3. Each light emitter may emit, sequentially, a respective light. Respective estimates of an object distance may be made, such as by, for each light, using average signal strengths from multiple pairs of light detectors. The four estimates may be averaged (possibly with weights, such as based on signal strength), with possibly any outlier values discarded. Or, for each light, signal strengths from just as single pair of light detectors may be used to obtain separate estimates of object distances that may indicate tilt or orientation of the object.

Figure 5:
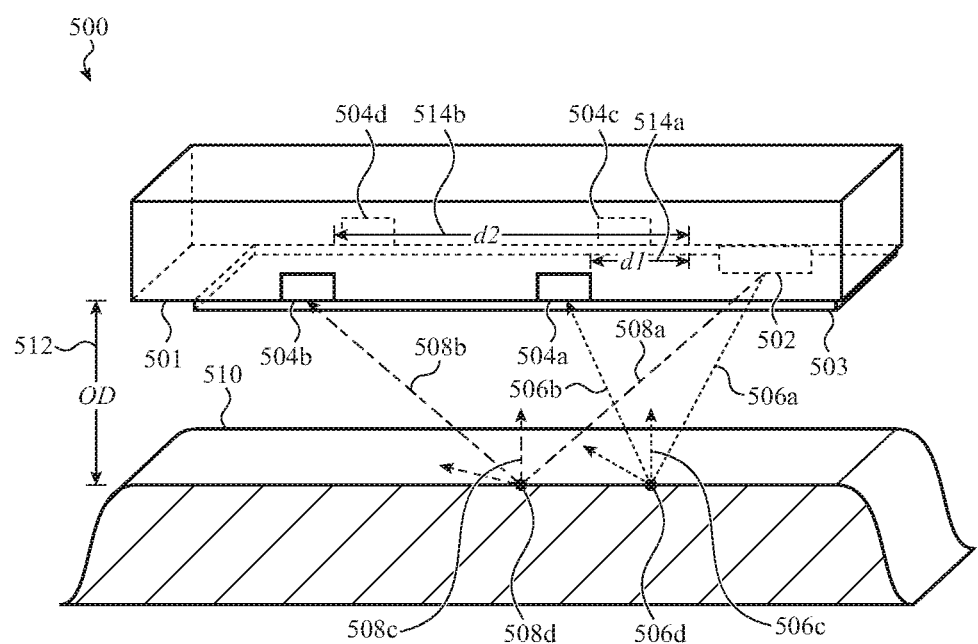
FIG. 5 illustrates a side view of an electronic device in proximity to an exterior object, according to an embodiment.

FIG. 5 shows a cross-sectional view of an electronic device 500 and an exterior object 510 that is at an object distance OD 512 from the electronic device 500. The electronic device 500 has a housing 501, and may have an optional cover (such as a crystal or cover on a smart watch) 503. The electronic device 500 includes a light emitter 502 positioned on the housing 501, or proximate to the housing 501, and able to emit light toward the object 510.

The electronic device 500 also includes a first pair of light detectors: the first light detector 504a positioned on or proximate to the exterior of the housing 501 at a separation distance $d_1$ 514a from the light emitter 502 and a second light detector 504b positioned on or proximate to the housing 501 at a separation distance $d_2$ 514b from the light emitter 502. Also, the electronic device 500 includes a second pair of light detectors: the light detectors 504c and 504d, respectively at separation distances $d_1$ 514a and $d_2$ 514b. For simplicity, the pairs of light detectors are shown along parallel lines but this need not be the case.

Light emitted from the light emitter 502 may follow two light paths to be detected at the light detectors 504a, 504b, and/or may also follow two analogous light paths to be detected at the light detectors 504c, 504d. These light paths are generalized examples of how light may reach the emitters rather than specific, necessary paths. The first light path consists of the outward path section 506a and the reflected path section 506b, extending from the point of reflection 506d to the light detector 504a. At the point of reflection 506d, light may be reflected or refracted in multiple directions such that some light is not received at (or does not impinge on) the light detector 504a, as indicated by the reflections 506c. The second light path consists of the outward path section 508a and the reflected path section 508b, extending from the second point 508d to the light detector 504b. At the point of reflection 508d, some light may be reflected or refracted in multiple directions such that this light is not received at (or does not impinge on) the light detector 504b, as indicated the reflection 508c.

The two light paths will have different total travel distances (or "path lengths"). Given a stationary object, path lengths increase as separation distance increases. As the path lengths increase, more light is scattered from the object 510 and so is not received by the light detector. Accordingly, the signal strength of light at light detector 504b is less than that measured at light detector 504a. Similarly, if the electronic device 500 is tilted as shown in FIG. 5, light detector 504c is further away from object 510 than is light detector 504a and light detector 504d is further away from object 510 than is detector 504c. Thus, the first light detector pair (e.g., light detectors 504a and 504b) receives signals having higher strengths than does the second light detector pair (e.g., light detectors 504c and 504d). Put another way, each of the light detectors in the first light detector pair receive more light as compared to their counterparts in the second light detector pair. Thus, the signal strength ratio of the first light detector pair is greater than the signal strength ratio of the second light detector pair. This is true whether the signal strength is that of the light received by a light detector or the signal generated by a given light detector in response to receiving light, insofar as the signal strength of a generated signal is proportional to the amount of light received. Accordingly, the electronic device 500 may determine that it is tilted or offset in such a fashion that the light detectors 504a, 504b are closer to the object 510 than are the light detectors 504c, 504d.

Figure 6A:
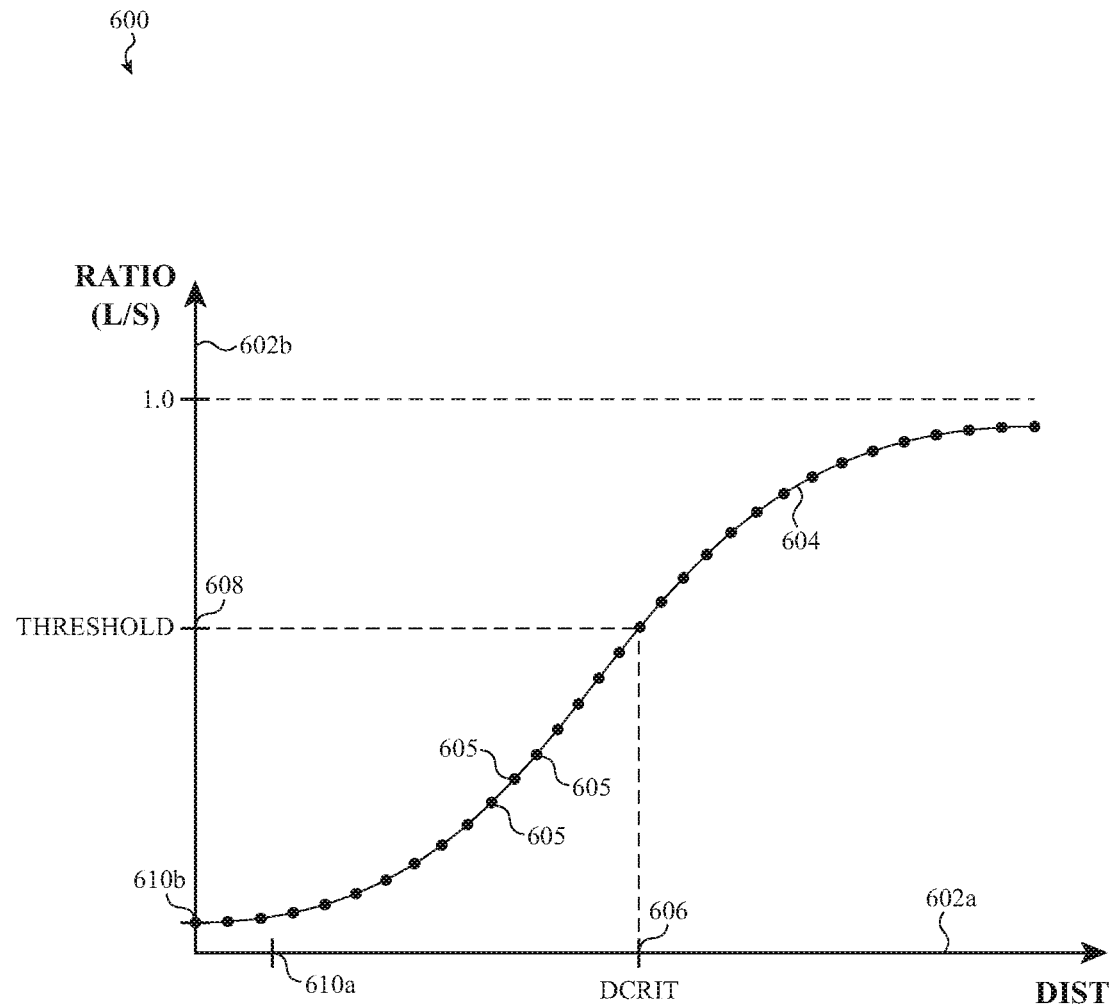
FIGS. 6A-B illustrate proximity curves, according to an embodiment.

FIG. 6A shows a first graph 600 of a proximity curve 604 in which the horizontal axis 602a represents the object distance Dist (which is OD of FIG. 5), and the vertical axis 602b represents the ratio value of the signal strength of the detector that is nearest the emitter (e.g., the short length detector) divided by a signal strength of the detectors that is furthest from the emitter (e.g., the long length detector). The proximity curve 604 may be obtained from a geometric analysis or from interpolation from experimentally measured values, as indicated by the discrete points 605.

In the case that the ratio value is less than or equal to the critical distance value 608, it may be determined that the object distance is less than or equal to a critical distance $D_{crit}$ 606 at which the electronic device may determine that the object is sufficiently close (for example, that a smart watch is being worn, or health monitor is attached to patient) for the electronic device to enter a corresponding operational state or mode. The "critical distance value" is a value of the ratio that corresponds to a critical distance. Accordingly and as used herein, the critical distance value is dimensionless (as is the ratio) and is not, itself, a measurement of distance but instead correlates to a critical distance. In some embodiments, the critical distance is a distance typically reached only when an electronic device has been removed from a wearer, and/or a distance at which certain functions of the electronic device do not operate, cease to become reliable, or otherwise are altered. The critical distance thus may be a distance that, when exceeded, causes the electronic device to change certain operations, functionalities, states, or the like. In certain embodiments, the critical distance may be approximately 10 centimeters, although this may vary between embodiments.

In some embodiments, the electronic device may use two critical distances: a near critical distance and a far critical distance. The electronic device may have three distinct operational states based on the two critical distance values. In a first situation, a determined object distance is less than the near critical distance, and so the electronic device may determine that is sufficiently close to the object to enable a first operational state (for example, a fully operational state). In a second situation, the determined object distance is greater than the far critical distance and so the electronic device may determine that it should enable a second operational state (for example, a powered-off state, a locked state, or the like). In a third situation, the determined object distance is greater than the near critical distance but less far the longer critical distance. In this this situation, the electronic device may be in a zone of uncertainty, where it may not be close enough to the object to enable the first operational state and not far enough from the object to enable the second operational state. In some embodiments, the electronic device may enable a third operational state when the determined object distance is greater than the near critical distance but less than the far critical distance. For example, the third operational state may provide limited functionality, may provide full functionality for a limited time, or may provide no functionality for a limited time. As another option, the electronic device may maintain its operational state for a limited time while it is in the zone of uncertainty rather than changing operational states.

The ratio value calculated by dividing the long length detector's signal strength by the short length detector's signal strength is always less than one, and the ratio (and thus proximity curve 604) approaches one as the value of Dist increases. As the value of Dist approaches 0, the ratio would, from geometric considerations, approach the limit ratio value 610b equal to $d_1/d_2$ for $d_1$ 514a and $d_2$ 514b as shown in FIG. 5. However, for such small values of Dist, such as below a limit value 610a, the electronic device's measurements or determinations of the signal strengths may approach a constant, or may become indeterminate or invalid, insofar as the variation in signal strengths becomes extremely large.

Further, a tilt, skew, offset, or other alignment of an electronic device may be determined by comparing the relative signal strength ratios of different pairs of detectors and/or detectors within a pair. Since the detectors are generally coplanar and light detectors that are closer to an object have higher signal strengths (as they receive more light reflected from the object), the relative signal strengths of the light detectors indicate the orientation of the electronic device's housing relative to the object. "Tilt" generally refers to a condition where a surface of the electronic device through which light is emitted (an "emission surface") extends at an angle from a surface of an object, or from a plane generally containing a surface of the object (an "object plane"). "Offset" refers to a condition where the emission surface of the electronic device is generally parallel to the object plane, but the emission surface is laterally offset from the object. "Skew" refers to a condition where the emission surface is both tilted and offset.

Figure 6B:
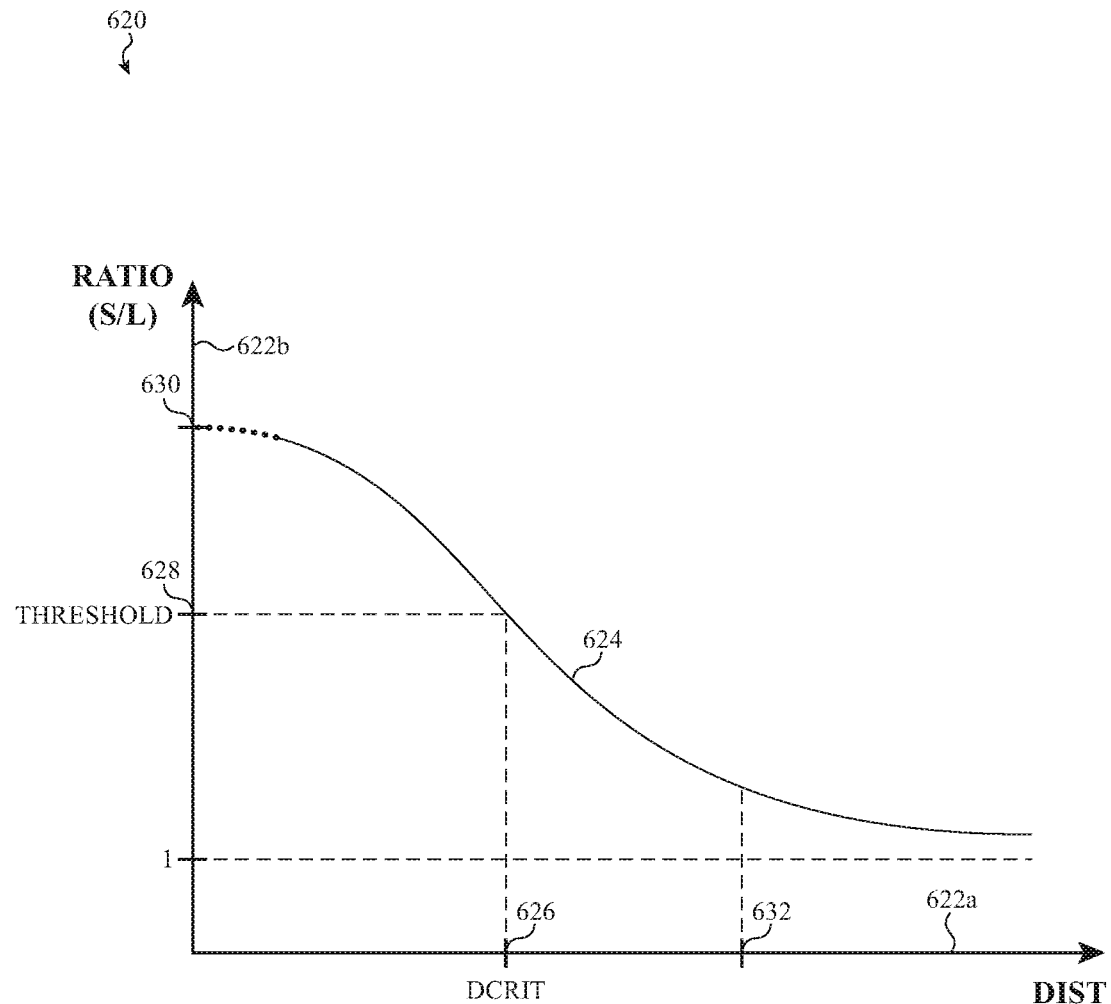

FIG. 6B shows a second graph 620 of an alternate proximity curve 624 in which the horizontal axis 622a represents the object distance Dist (which is OD of FIG. 5), and the vertical axis 622b represents the ratio value of the signal strength of the shorter length detector to the signal strength of the longer length detector. The proximity curve 624 may be obtained from a geometric analysis or from interpolation from experimentally measured values. The ratio value of the long path length to the short path length is always greater than 1, and the ratio (and thus proximity curve 624) approaches 1 as the value of Dist decreases toward 1. As the value of Dist decreases toward 0, the ratio value will increase to a limit value 630 equal to $d_2/d_1$, for $d_1$ 514a and $d_2$ 514b as shown in FIG. 5. As before, for such small values of Dist, the electronic device's measurements or determinations of the path lengths of the light's light paths may not be valid.

In the case that the ratio value of the long path length to the short path length is greater than or equal to the critical distance value 628, it may be determined that the object distance is less than or equal to a critical distance $D_{crit}$ 626 at which the electronic device may determine that the object is sufficiently close for the electronic device to enter a corresponding operational state or mode.

The optical-based object distance determination methods described above (using at least one light emitter in conjunction with at least one pair of light detectors at different separation distances, or two pairs of light detectors that are grouped by their position relative to an axis passing through the emitter) may be used by wearable electronic devices in conjunction with other sensors for detecting proximity of a human user. Certain other types of proximity sensors, for example, may use or be based on detecting skin tones or colors, or amounts of light reflected from a person's skin, or the like. However, such other sensors may not adequately handle cases where a user has hirsute or tattooed arms, or prosthetic devices. Because they employ a dimensionless signal strength ratio-based distance determination, the embodiments described above can overcome such limitations.

Further embodiments may use multiple pairs of light emitters in conjunction with multiple pairs of light detectors, such as the embodiment of FIG. 3, to improve the accuracy of the object distance determinations, as well as potentially determining a tilt of the exterior object. When multiple light detectors are used and corresponding multiple estimates of the object distance based on relative signal strength ratios are then obtained, the multiple estimates may be averaged to improve accuracy. Also, obtaining multiple preliminary estimates of the object distance using multiple lights from multiple sensors can allow for indeterminate estimates to be disregarded. Hair, tattoos, and prosthetics may react differently than skin, for example, in an embodiment that estimates object distances based on absolute reflectance or values of light. Further, different skin pigmentations may alter absorption, reflection, and/or scattering and so may cause different readings even though the skin is at the same distance. For example, a hair follicle, or a dark tattoo, may block reflections along one of the two light paths described in relation to FIG. 5, so that one of the light detectors does not receive a reflection of the light (e.g., the light detector does not create a high enough output signal within an enabled detection period). In another example, a light detector may create a positive reception signal due to ambient light reception or due to noise. A distance determination based on such an erroneous signal may be too different from the remaining distance determinations produced using other light from other light emitters and received at other light detectors. By contrast, embodiments described herein rely on relative signal strengths of light detectors. Insofar as any variance or change in an object's surface will affect the signal at all detectors, the relative signal strengths (e.g., the ratio of signal strengths) remains unchanged. This is true whether the object reflecting light from an emitter to the detectors is skin or another substance.

Figure 7:
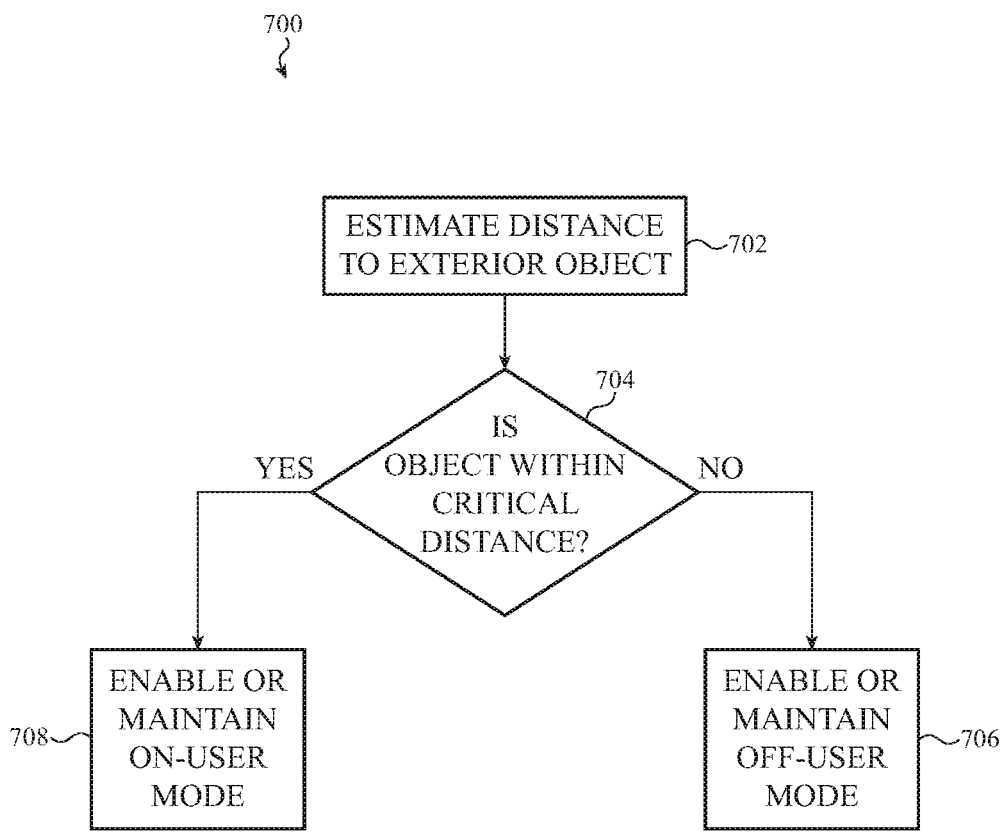
FIG. 7 is a flow chart of a method of operating an electronic device, according to an embodiment.

FIG. 7 is a flow chart of a method 700 of operating an electronic device to detect proximity of an exterior object, and/or estimate whether the exterior object is within a critical distance. The method 700 may be used with the electronic devices as described above, or by other electronic devices. The method may be initiated by the electronic device on a fixed schedule or time intervals, by a user input, or by a signal from a sensor of the electronic device.

At block 702, an electronic device estimates a distance to an exterior object (e.g., an object distance). This may be by the optical components and procedures discussed previously, or by other methods.

At block 704, the estimate of the object distance is compared to a critical distance. The critical distance may be a fixed value stored by the electronic device, or may be an adaptively set value.

At block 706, in the case that the estimated object distance is found to be more than the critical distance, the electronic device may enable or maintain an off-user mode. As an example, when the device enters an off-user mode, it may change its operation. Continuing this example, the device may lock, power down, sleep, disable certain functionality or the like, and may require a security check be passed before unlocking, waking, or restoring functionality. Such a security check may be entry of a valid passcode, receipt of a valid biometric identifier, or the like. Additionally or alternatively, certain features (e.g., one or more health monitoring functions, communication functions, display functions, and so on) may be disabled while the device is in an off-user mode. Similarly, user alerts may take a different form, may be enhanced, or may be disabled when the device is in an off-user mode and as compared to those user alerts when the device is in an on-user mode. As one example, a user alert may be a haptic alert when the device is in an on-user mode while the user alert may be a visual or audible alert when the device is in an off-user mode.

At block 708, in the case that the estimated object distance is found to be less than the critical distance, the electronic device may enter an operational state that assumes the electronic device is on or near enough to the user. As an example, for a health monitor, in the on-user mode of operation various sensors (e.g., pulse, temperature, etc.) may be started and their respective measurements recorded and transmitted. As another example, a smart watch may enter a powered up state under the assumption that the exterior object is a user's wrist and that the smart watch is being worn by the user. As another example, a smart phone may determine that object is a table and so reduce power to an on-board camera pointed toward the table. In certain embodiments, the operational state may enable or maintain an on-user mode, where functionality and operation of the electronic device assumes, is based on, or otherwise functions as if the device is worn or held by a user.

Figure 8:
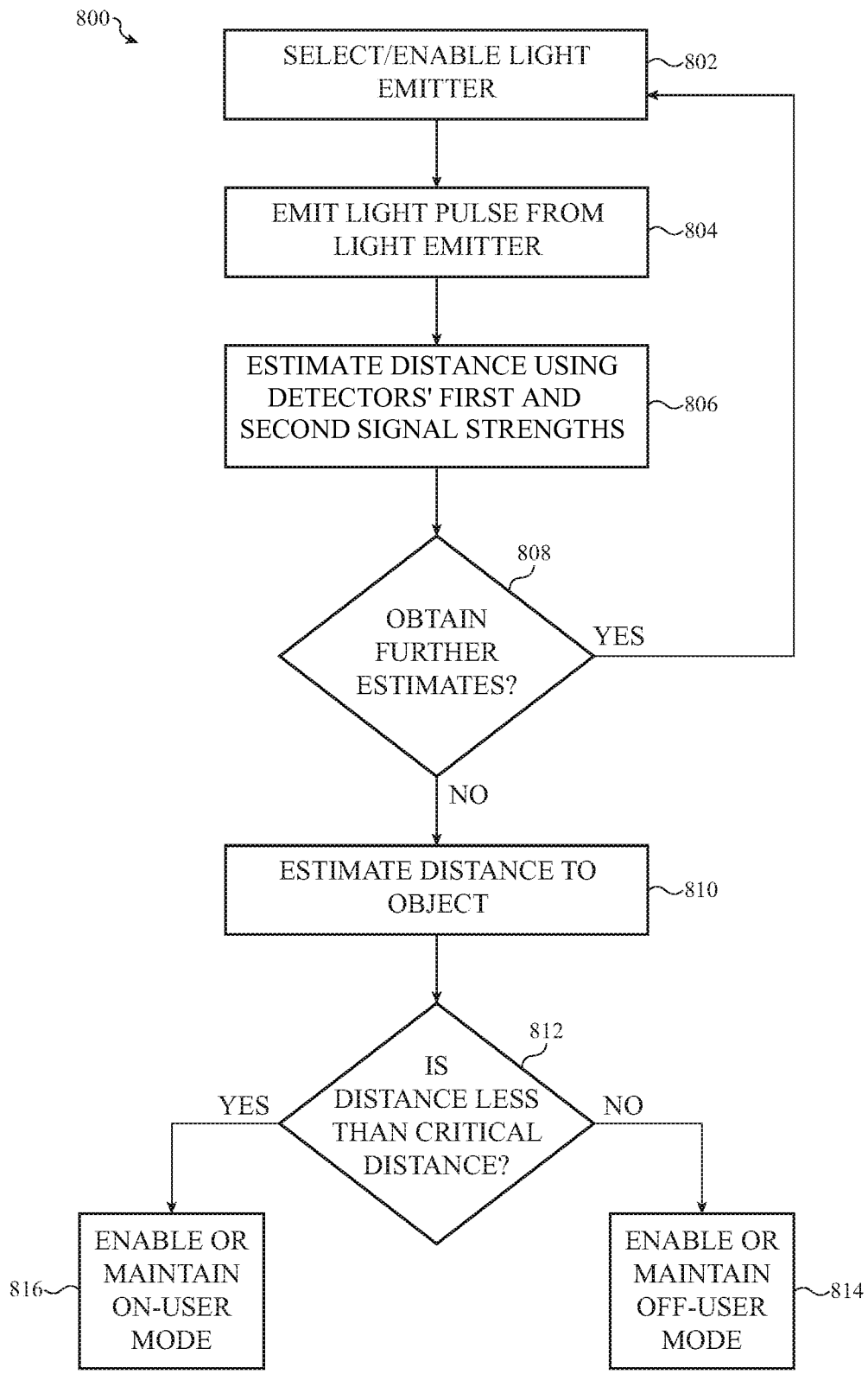
FIG. 8 is a flow chart of a method of operating an electronic device, according to an embodiment.

FIG. 8 is a flow chart of a method 800 of operating an electronic device having a light emitter and at least one pair of light detectors to detect proximity of an exterior object, and/or estimate whether the exterior object is within a critical distance. The method 800 may be used with the electronic devices as described above, or by other electronic devices. The method may be initiated by the electronic device on a fixed schedule or time intervals, by a user input, or by a signal from a sensor of the electronic device.

At block 802, a light emitter may be selected or enabled. A selection may be based on a change of state (e.g., a position change detected by an accelerometer, or a change in ambient light) of the electronic device, or on another basis, such as a rotation schedule between multiple light emitters.

At block 804, the selected light emitter emits a light. The emitted light may be from a fixed direction outward from the electronic device, or variably directed outward in an expected direction of the exterior object.

At block 806, a first estimate is made to obtain a first estimated object distance based on light emitted by the first emitter and the resulting ratio of signal strengths from a corresponding pair of light detectors. Also, a second estimate may be made of a second estimated object distance based on light emitted by a second emitter and a resulting ratio of signal strengths form a corresponding pair of light detectors. The general functions and methodology to make such estimates are discussed elsewhere herein.

At block 808, a decision is made whether to make further estimates of object distances. A determination that such further estimates are to be made may occur when at least one of the first or second estimates at block 806 could not be determined. For example, one of the light detectors may not have received any reflected light. In another example, the method may use multiple light detector pairs for improved accuracy. As yet another option, further estimates of object distances may occur when a first estimate of an object distance is indeterminate. When it is determined that such further estimates are to be made, the method 800 returns to block 802 to select either another light emitter or use the current light emitter to repeat the operations of blocks 804 and 806.

At block 810, based on the various pairs of long and short lengths of light between the selected light emitter(s) and pairs of light detectors, a distance estimate is formed of a distance from the electronic device to an exterior object (or, more specifically, an exterior surface of an object). The object distance estimate may be a selection (for example, based on signal strengths) of a single object distance estimate of many, or as a weighted average of multiple object distance estimates.

At block 812, the estimated distance from the electronic device to the object is compared to a critical value, and determined to be either greater than or equal to the critical value or less than the critical value. The critical value may be fixed or may be adaptively and/or dynamically adjusted. Also at block 812, a determination may be made whether to confirm that estimated distance is greater or less than the critical distance. For example, if such an initial estimate is based on a single distance determination, or from multiple but conflicting determinations that the distance is less than the critical distance, the electronic device may return to block 802. In the method 800, the electronic device may return to block 802 and repeat the emission(s) of light and measurements of ratios of signal strengths, with possibly alternate light emitters and light detectors. Such a confirmation operation may be used if the initial estimated distance would cause a change of operational state of the electronic device.

At block 814, in the case that the estimated object distance is greater than or equal to the critical value, the electronic device may enable or maintain an off-user mode. Such modes may be as described above for block 706 of method 700.

At block 816, in the case that the estimated object distance is less than the critical value, the electronic device enables an on-user operation mode. The electronic device may either transition to such a mode if not presently in it, or may remain in that mode if currently in that on-user mode. The on-user mode may refer to any of the operational modes or procedures discussed above for the various examples and embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   a housing;
   a first light emitter operable to emit light outward from or through the housing;
   a second light emitter operable to emit light outward from or through the housing, wherein the first light emitter and the second light emitter are positioned to lie on an axis across a backside of the housing;
   a first light detector positioned within the housing at a first separation distance from the first light emitter and configured to receive light emitted by at least one of the first light emitter or the second light emitter;
   a second light detector positioned within the housing at a second separation distance from the first light emitter and configured to receive light emitted by at least one of the first light emitter or the second light emitter, wherein the second separation distance is different from the first separation distance; and
   a processor configured to estimate an object distance by:

determining a first signal strength of the first light detector;
determining a second signal strength of the second light detector; and
using a ratio of the first signal strength and the second signal strength to estimate the object distance; wherein:
the object distance is a distance from the electronic device to an object; and
the first light detector and the second light detector are positioned on a first side of the axis.

2. The electronic device of claim 1, wherein:
the second separation distance is less than the first separation distance.

3. The electronic device of claim 1, wherein the first separation distance is less than the second separation distance.

4. The electronic device of claim 1, wherein, in the event that the processor estimates that the object distance is less than a critical distance, selecting a corresponding operational state of the electronic device.

5. The electronic device of claim 1, wherein:
the electronic device is an electronic watch; and
the object is a limb of a person wearing the electronic watch.

6. The electronic device of claim 1, wherein:
the electronic device further comprises:
a third light detector positioned within the housing at the first separation distance from the second light emitter; and
a fourth light detector positioned within the housing at the second separation distance from the second light emitter.

7. The electronic device of claim 6, wherein the first light emitter and the second light emitter emit light at different times.

8. The electronic device of claim 6, wherein:
the third light detector and the fourth light detector are positioned on a second side of the axis.

9. The electronic device of claim 6, wherein:
the object distance is a first object distance; and
the processor is further configured to:
determine a third signal strength of the third light detector;
determine a fourth signal strength of the fourth light detector; and
use the third signal strength and the fourth signal strength to estimate a second object distance.

10. The electronic device of claim 9, wherein the processor determines a tilt of the object relative to the electronic device based on:
the ratio of the first signal strength to the second signal strength; and
a ratio of the third signal strength to the fourth signal strength.

11. An electronic device, comprising:
a housing;
a first light emitter operable to emit light outward from or through the housing;
a second light emitter operable to emit light outward from or through the housing, wherein the first light emitter and the second light emitter are positioned to lie on an axis across a backside of the housing;
a first pair of light detectors positioned on a first side of the axis and configured to receive light emitted by at least one of the first light emitter or the second light emitter;
a second pair of light detectors positioned on a second side of the axis and configured to receive light emitted by at least one of the first light emitter or the second light emitter; and
a processor operably connected to the first and second light emitters and the first and second pairs of light detectors; wherein:
the processor estimates a first object distance from the electronic device to an object exterior to the electronic device at least partially by determining a ratio of signal strengths of the first pair of light detectors; and
the processor estimates a second object distance from the electronic device to the object exterior to the electronic device at least partially by determining a ratio of signal strengths of the second pair of light detectors.

12. The electronic device of claim 11, wherein:
the first pair of light detectors comprises:
a first light detector separated from the first light emitter by a first separation distance; and
a second light detector separated from the first light emitter by a second separation distance; wherein:
the ratio of signal strengths of the first pair of light detectors varies with:
the first separation distance;
the second separation distance; and
the first object distance.

13. The electronic device of claim 11, wherein:
the light from the first light emitter and the light from the second light emitter have the same wavelength.

14. The electronic device of claim 13, wherein:
the signal strengths of the first pair of light detectors are based on an amount of light emitted by the first light emitter and received by the first pair of light detectors; and
the signal strengths of the second pair of light detectors are based on an amount of light emitted by the second light emitter and received by the second pair of light detectors.

15. The electronic device of claim 11, wherein the processor uses the first object distance and the second object distance to determine a tilt of the housing with respect to the object.

16. A method of operating an electronic device comprising a first light emitter and a second light emitter positioned on an axis across a backside of a housing, the method comprising:
estimating that an object exterior to the electronic device is within a critical distance of the electronic device by:
emitting, from at least one of the first light emitter or the second light emitter, an emitted light outward from or through the housing of the electronic device;
determining a first signal strength produced by a first light detector that varies with a portion of the emitted light reflected from the object and received by the first light detector, wherein the first light detector is positioned on a first side of the axis;
determining a second signal strength produced by a second light detector that varies with another portion of the emitted light reflected from the object and received by the second light detector, wherein the second light detector is positioned on the first side of the axis;
determining a ratio of the first signal strength and the second signal strength;
determining that the object is within the critical distance when the ratio is less than a critical distance value; and enabling an operation of the electronic device when the object is within the critical distance.

17. The method of claim 16, further comprising disabling the operation of the electronic device when the processor determines that the object is not within the critical distance.

18. The method of claim 16, wherein:
the ratio is a first ratio;
the first light detector is positioned a first separation distance from the first light emitter;
the second light detector is positioned a second separation distance from the first light emitter;
the second separation distance is greater than the first separation distance; and
the method further comprises
determining a strength of a third signal of a third light detector that is positioned on a second side of the axis;
determining a strength of a fourth signal of a fourth light detector that is positioned on the second side of the axis;
determining a second ratio of the strength of the third signal and the strength of the fourth signal; and
determining that the object is within the critical distance when the second ratio is less than the critical distance value.

19. The method of claim 18, further comprising estimating a tilt or offset of the electronic device relative to the object based on the first and second ratios.

20. The method of claim 16, wherein:
the first signal strength is one of a maximum signal strength, a minimum signal strength, an average signal strength, or a highest confidence signal strength of the light received by the first light detector; and
the second signal strength is one of a maximum signal strength, a minimum signal strength, an average signal strength, or a highest confidence signal strength of the light received by the second light detector.

* * * * *